US007836145B2

(12) United States Patent
Taguchi et al.

(10) Patent No.: US 7,836,145 B2
(45) Date of Patent: *Nov. 16, 2010

(54) COMPUTER SYSTEM, MANAGEMENT METHOD, AND MANAGEMENT COMPUTER FOR MANAGING DATA ARCHIVING STORAGE EXTENTS BASED ON SERVER PERFORMANCE MANAGEMENT INFORMATION AND STORAGE UTILIZATION INFORMATION

(75) Inventors: Yuichi Taguchi, Sagamihara (JP); Hiroshi Nasu, Yokohama (JP); Yuri Hiraiwa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 12/200,289

(22) Filed: Aug. 28, 2008

(65) Prior Publication Data
US 2010/0011085 A1    Jan. 14, 2010

(30) Foreign Application Priority Data
Jul. 9, 2008    (JP)    ............................. 2008-178782

(51) Int. Cl.
*G06F 15/167*    (2006.01)
(52) U.S. Cl. ........................ 709/214; 709/223; 709/224; 711/170
(58) Field of Classification Search ................ 709/214, 709/223, 224; 711/161, 170
See application file for complete search history.

(56) References Cited

U.S. PATENT DOCUMENTS

| 6,611,923 | B1 * | 8/2003 | Mutalik et al. .............. 709/229 |
| 7,085,904 | B2 * | 8/2006 | Mizuno et al. .............. 711/162 |
| 7,412,504 | B2 * | 8/2008 | Hirata et al. ................ 709/223 |
| 7,574,577 | B2 * | 8/2009 | Shimozono et al. ......... 711/170 |
| 7,669,029 | B1 * | 2/2010 | Mishra et al. ............... 711/170 |
| 2004/0193827 | A1 * | 9/2004 | Mogi et al. .................. 711/170 |
| 2005/0267929 | A1 | 12/2005 | Kitamura |
| 2008/0028049 | A1 * | 1/2008 | Taguchi et al. .............. 709/220 |
| 2008/0162810 | A1 * | 7/2008 | Taguchi et al. .............. 711/114 |
| 2009/0282209 | A1 * | 11/2009 | Shimozono et al. ......... 711/170 |

FOREIGN PATENT DOCUMENTS

| JP | 2004-139200 | 5/2004 |
| JP | 2006-228188 | 8/2006 |
| WO | 2005/043323 A2 | 5/2005 |

* cited by examiner

*Primary Examiner*—Ramy M Osman
(74) *Attorney, Agent, or Firm*—Brundidge & Stanger, P.C.

(57) ABSTRACT

To manage the configuration of a data archiving system without increasing the load on the data archiving system while keeping the performance of computers and the load on storage subsystems balanced, there is provided a computer system, including: a plurality of data archiving servers; a storage subsystem which provides storage extents to the plurality of data archiving servers; and a management computer. The management computer manages data archiving server performance management information, which holds information about performance of the plurality of data archiving servers, and storage utilization information, which holds information about load on the storage extents. The management computer changes the association between the data archiving storage extents and the storage extents based on a data archiving server performance management information and a storage utilization information.

14 Claims, 27 Drawing Sheets

| RAID GROUP IDENTIFICATION INFORMATION | MAGNETIC DISK DRIVE IDENTIFICATION INFORMATION | | | |
|---|---|---|---|---|
| | #1 | #2 | #3 | #4 |
| RG-01 | HD-01 | HD-02 | HD-03 | HD-04 |
| RG-11 | HD-11 | HD-12 | HD-13 | HD-14 |
| ... | ... | ... | ... | ... |

*FIG. 9*

| STORAGE EXTENT IDENTIFICATION INFORMATION | RAID GROUP IDENTIFICATION INFORMATION | STARTING BLOCK ADDRESS | ENDING BLOCK ADDRESS |
|---|---|---|---|
| LD-01 | RG-01 | 0x0001 | 0x0100 |
| LD-02 | RG-02 | 0x0101 | 0x0200 |
| LD-03 | RG-02 | 0x0201 | 0x0300 |
| LD-04 | RG-03 | 0x0101 | 0x0500 |
| ... | ... | ... | ... |

*FIG. 10*

| COMMUNICATION INTERFACE IDENTIFICATION INFORMATION 10041 | STORAGE UNIT IDENTIFICATION INFORMATION 10042 | STORAGE EXTENT IDENTIFICATION INFORMATION 10043 | ACCESS-PERMITTED COMMUNICATION INTERFACE IDENTIFICATION INFORMATION 10044 |
|---|---|---|---|
| 50:00:01:1E:0A:E8:02 | LU-11 | LD-01 | 50:00:01:1E:0A:E8:A1 |
| | | | 50:00:01:1E:0A:E8:A2 |
| 50:00:01:1E:0A:E8:02 | LU-12 | LD-02 | 50:00:01:1E:0A:E8:A1 |
| ... | ... | ... | ... |

| Time 10061 | LD-01 10062 | LD-02 | LD-03 | ... |
|---|---|---|---|---|
| 2008.01.01 0:00 | 15 | 2 | 1 | ... |
| 2008.01.01 0:01 | 0 | 24 | 2 | ... |
| 2008.01.01 0:02 | 23 | 56 | 0 | ... |
| ... | ... | ... | ... | ... |

|  30031 | 30032 | 30033 | 30034 | 30035 |
|---|---|---|---|---|
| DATA ARCHIVING STORAGE EXTENT IDENTIFICATION INFORMATION | COMMUNICATION INTERFACE IDENTIFICATION INFORMATION | STORAGE UNIT IDENTIFICATION INFORMATION | OCCUPIED CAPACITY RATIO | TRANSFERRED DATA AMOUNT |
| /mount/data 1 | 50:00:01:1E:0A:E8:02 | LU-11 | 40% | 10 |
| /mount/data 2 | 50:00:01:1E:0A:E8:02 | LU-12 | 32% | 24 |
| ... | ... | ... | ... | ... |

FIG. 13  3003

| 30061 | 30062 | 30063 |
|---|---|---|
| FILE IDENTIFICATION INFORMATION | DATA ARCHIVING SERVER IDENTIFICATION INFORMATION | DATA ARCHIVING STORAGE EXTENT IDENTIFICATION INFORMATION |
| 0011.dat | 192.168.0.1 | /mount/data 2 |
| 0012.dat | 192.168.0.2 | /mount/data 3 |
| ... | ... | ... |

FIG. 14  3006

| 30071 | 30072 |
|---|---|
| SERVER IDENTIFICATION INFORMATION | SERVER SEARCH CALCULATION INFORMATION |
| 192.168.0.1 | 0 |
| 192.168.0.2 | 1 |
| 192.168.0.3 | 2 |
| ... | ... |

FIG. 15  3007

| | 50051 | 50052 | | |
|---|---|---|---|---|
| | | 50:00:01:1E:0A:E8:02 | 50:00:01:1E:0A:E8:02 | ... |
| | Time | LU-11 | LU-12 | ... |
| | 2008.01.01 0:00 | 15 | 2 | ... |
| | 2008.01.01 0:01 | 0 | 24 | ... |
| | 2008.01.01 0:02 | 23 | 56 | ... |
| | ... | ... | ... | ... |

| DATA I/O PERFORMANCE RANK (50071) | DATA ARCHIVING SERVER IDENTIFICATION INFORMATION (50072) | COMMUNICATION INTERFACE IDENTIFICATION INFORMATION (50073) |
|---|---|---|
| 1 | 192.168.0.3 | 50:00:01:1E:0A:E8:A4 |
| 2 | 192.168.0.1 | 50:00:01:1E:0A:E8:A1 |
| 2 | 192.168.0.2 | 50:00:01:1E:0A:E8:A3 |
| ... | ... | ... |

COMPUTER SYSTEM, MANAGEMENT METHOD, AND MANAGEMENT COMPUTER FOR MANAGING DATA ARCHIVING STORAGE EXTENTS BASED ON SERVER PERFORMANCE MANAGEMENT INFORMATION AND STORAGE UTILIZATION INFORMATION

CLAIM OF PRIORITY

The present application claims priority from Japanese application JP2008-178782 filed on Jul. 9, 2008, the content of which is hereby incorporated by reference into this application.

BACKGROUND

This invention relates to a computer system including a computer and a storage subsystem, and more particularly, to a technique of managing the configuration of the computer system.

Storage area network (SAN) is a known technology which couples at least one external storage subsystem and at least one computer. The storage area network is effective particularly when a plurality of computers share one large-scale storage subsystem. A storage system containing the storage area network is easy to add or remove a storage subsystem or a computer, and accordingly has high scalability.

Disk array devices are often commonly used as an external storage subsystem coupled to a SAN. A disk array device is equipped with a plurality of storage devices (e.g., magnetic disk drives), typically, hard disks.

A disk array device manages several magnetic disk drives as one RAID group by a technology called redundant array of independent disks (RAID). A RAID group forms at least one logical storage extent. A computer coupled to a SAN executes data input/output processing in the storage extents. When recording data in the storage extents, the disk array device records redundant data in magnetic disk drives that constitute the RAID group. The redundant data enables the disk array device to recover data even when one of the magnetic disk drives breaks down.

Data archiving systems for long-term archiving have lately become popular as a measure to preserve contract documents, official documents, and the like for a long period of time. These data archiving systems have functions such as data protection (WORM), data location management, data deduplication, and quick search to provide a mechanism for preserving and managing data properly for years (see WO 2005/043323).

Data deduplication reduces the amount of data held in a system when a plurality of computers in the system hold the same data redundantly, by allowing only one of the computers to keep the data and giving the rest of the computers a reference to the unique copy (data storage location in a storage extent).

In data archiving systems which are kept in operation for a long time, adding computer resources and replacing a failed component with a new one are expected at some point in future. There may be a difference in performance between a newly introduced computer and a computer that has existed in the system.

The newly introduced computer in some cases is given a smaller amount of data to manage than the existing computer despite the new computer's superior performance. Also, if frequently accessed data is stored in the older computer, the concentration of load on the computer of inferior performance lowers the overall performance of the system. A load concentration on a low-performance server can occur also when data amount reducing processing such as deduplication changes the access frequency of the respective pieces of data and destroys the performance-based load balance among computers.

As a solution, data migration techniques are disclosed in JP 2006-228188 A and JP 2004-139200 A, where data is migrated from a heavy-load computer to a light-load computer in order to balance the load among a plurality of computers in a data archiving system and to thereby improve the performance of the system.

SUMMARY

With the techniques disclosed in JP 2006-228188 A and JP 2004-139200 A, data stored in the data archiving system has to be migrated between storage subsystems in order to balance the load and improve the performance of the system. In a data archiving system that stores large-capacity data, however, data migration processing itself is a heavy load when data is migrated.

Further, in a data archiving system with a mechanism that enables a plurality of computers to share management information about data location, simple data migration may create inconsistencies between the computers' management information and the actual data location, which makes data input/output unexecutable.

This invention has been made in view of the above, and it is an object of this invention to provide a technique of managing the configuration of a data archiving system without increasing the load on the data archiving system while keeping the performance of computers and the load on storage subsystems balanced.

The representative aspects of this invention are as follows. That is, there is provided a computer system, including: a plurality of data archiving servers in which a client stores data; a storage subsystem which provides storage extents to the plurality of data archiving servers; and a management computer which include access to the plurality of data archiving servers and the storage subsystem. The plurality of data archiving servers each include a first interface coupled to the storage subsystem, a first processor coupled to the first interface, and a first memory coupled to the first processor, and provide the client with data archiving storage extents to which the storage extents are allocated. The storage subsystem includes a second interface coupled to the plurality of data archiving servers, a second processor coupled to the second interface, and a second memory coupled to the second processor. The management computer includes a third interface coupled to the plurality of data archiving servers and the storage subsystem, a third processor coupled to the third interface, and a third memory coupled to the third processor. The plurality of data archiving servers each manage data location management information, which holds association between the data and a data archiving server of the plurality of data archiving servers that stores the data, and data archiving storage extent configuration information, which holds association between the data archiving storage extents and the storage extents. The data location management information is managed by the data archiving server that is determined based on the data. The management computer manages data archiving server performance management information, which holds information about performance of the plurality of data archiving servers, and storage utilization information, which holds information about load on the storage extents. The plurality of data archiving servers are each configured to:

identify, upon reception of a request from the client to read data, according to the data requested to be read, a data archiving server of the plurality of data archiving servers that manages data location management information of the requested data; obtain the data location management information managed by the identified data archiving server; identify, from the obtained data location management information, a data archiving server of the plurality of data archiving servers that is storing the requested data; and obtain the requested data from the data archiving server that is storing the requested data. The management computer is configured to: select, based on the data archiving server performance management information and the storage utilization information, data archiving storage extents whose association with the storage extents are to be changed; select, based on the storage utilization information, storage extents that are to be newly allocated to the selected data archiving storage extents; and notify the plurality of data archiving servers that provide the selected data archiving storage extents of the storage extents selected to be newly allocated. And the plurality of data archiving servers are each further configured to: allocate the storage extents notified by the management computer to the selected data archiving storage extents; and update the data location management information and the data archiving storage extent configuration information.

According to an aspect of this invention, the configuration of a data archiving system can be managed in a manner that improves the balance between the performance of computers and the load on storage subsystems.

BRIEF DESCRIPTION OF THE DRAWINGS

The present invention can be appreciated by the description which follows in conjunction with the following figures, wherein:

FIG. 9 is a diagram showing an example of RAID group configuration information which is stored in each storage subsystem according to the embodiment of this invention;

FIG. 11 is a diagram showing an example of logical unit configuration information that is stored in the storage subsystem according to the embodiment of this invention;

FIG. 12 is a diagram showing an example of storage utilization information which is stored in the storage subsystem according to the embodiment of this invention;

FIG. 13 is a diagram showing an example of data archiving storage extent configuration information which is stored in each data archiving server according to the embodiment of this invention;

FIG. 14 is a diagram showing an example of data location management information which is stored in each data archiving server according to the embodiment of this invention;

FIG. 15 is a diagram showing an example of hashing information which is stored in each data archiving server according to the embodiment of this invention;

FIG. 16 is a diagram showing an example of storage subsystem logical unit utilization information which is stored in the management computer 500 according to the embodiment of this invention;

FIG. 17 is a diagram showing an example of data archiving server performance information which is stored in the management computer according to the embodiment of this invention;

DETAILED DESCRIPTION OF THE PREFERRED EMBODIMENTS

Figure 1:
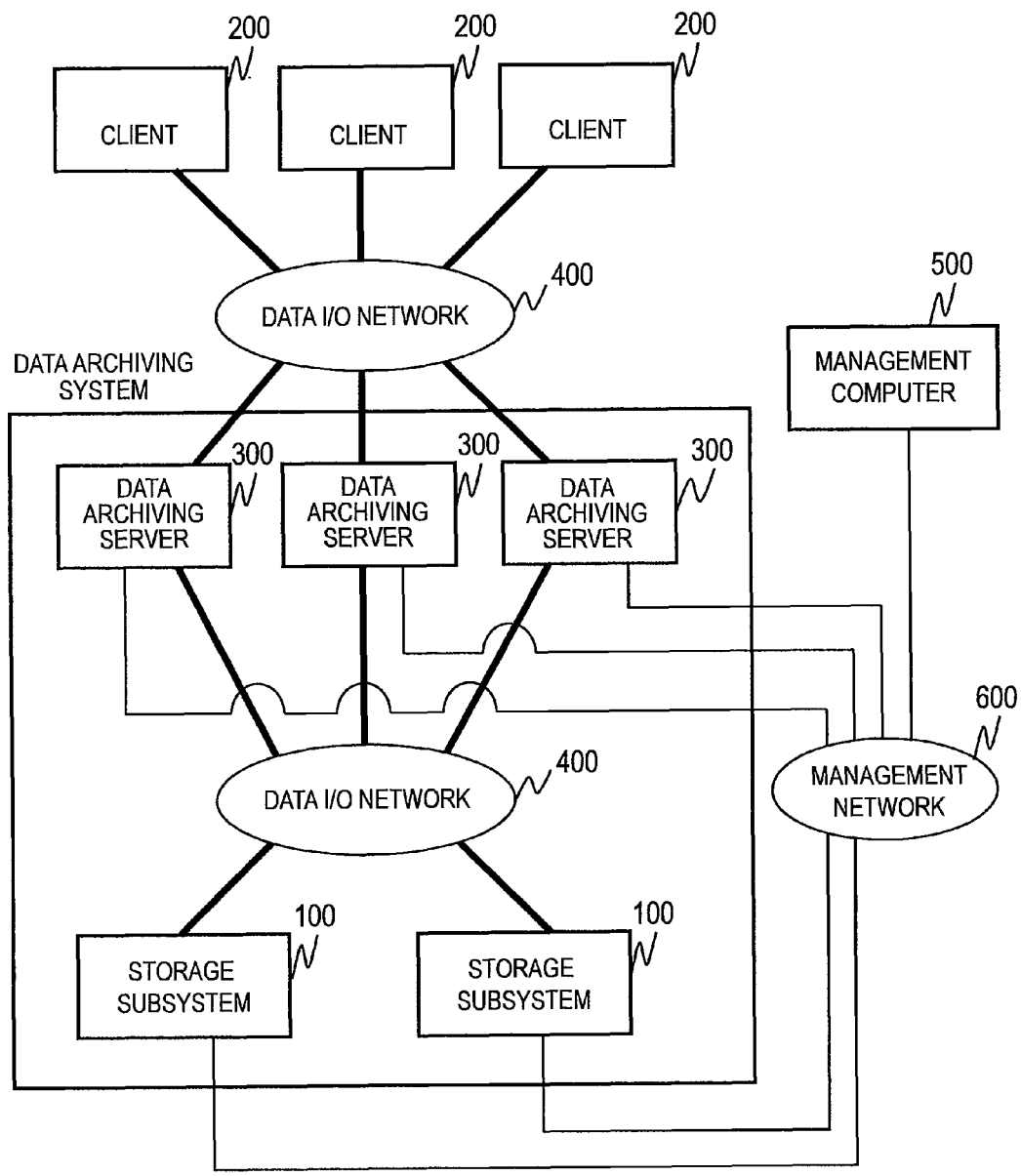
FIG. 1 is a diagram showing a configuration of a storage area network according to an embodiment of this invention.

FIG. 1 is a diagram showing a configuration of a storage area network according to an embodiment of this invention.

The storage area network includes a data input/output network 400 and a management network 600.

The data input/output network 400 contains a storage subsystem 100, a client 200, and a data archiving server 300. The storage subsystem 100, the client 200, and the data archiving server 300 are intercoupled via the data input/output network 400, and hence data is input to and output from each other. The data input/output network 400 is represented by the bold line in FIG. 1. The data input/output network 400 is fibre channel, Ethernet, or other networks of prior art.

The management network 600 is a network of prior art, such as fibre channel or Ethernet. The storage subsystem 100 and the data archiving server 300 couple to a management computer 500 via the management network 600.

The storage subsystems 100 are equipped with storage devices such as magnetic disk drives to provide storage extents for data read and written by the clients 200. The configuration of the storage subsystems 100 will be described later with reference to FIG. 2. The clients 200 create and update data stored in the storage subsystems 100 through the data archiving servers 300.

The data archiving servers 300 manage data stored in the storage subsystems 100. The data archiving servers 300 mount storage extents provided by the storage subsystems 100, and present the storage extents to the clients 200. The configuration of the data archiving servers 300 will be described later with reference to FIG. 3. Mainly, the data archiving servers 300 and the storage subsystems 100 constitute a data archiving system.

The management computer 500 couples to the storage subsystems 100 and the data archiving servers 300 through the management network 600 to manage the data archiving system. The configuration of the management computer 500 will be described later with reference to FIG. 4.

The management network 600 and the data input/output network 400, which, in the embodiment of this invention, are separate networks independent of each other, may be a single network that has the functions of both.

Figure 2:
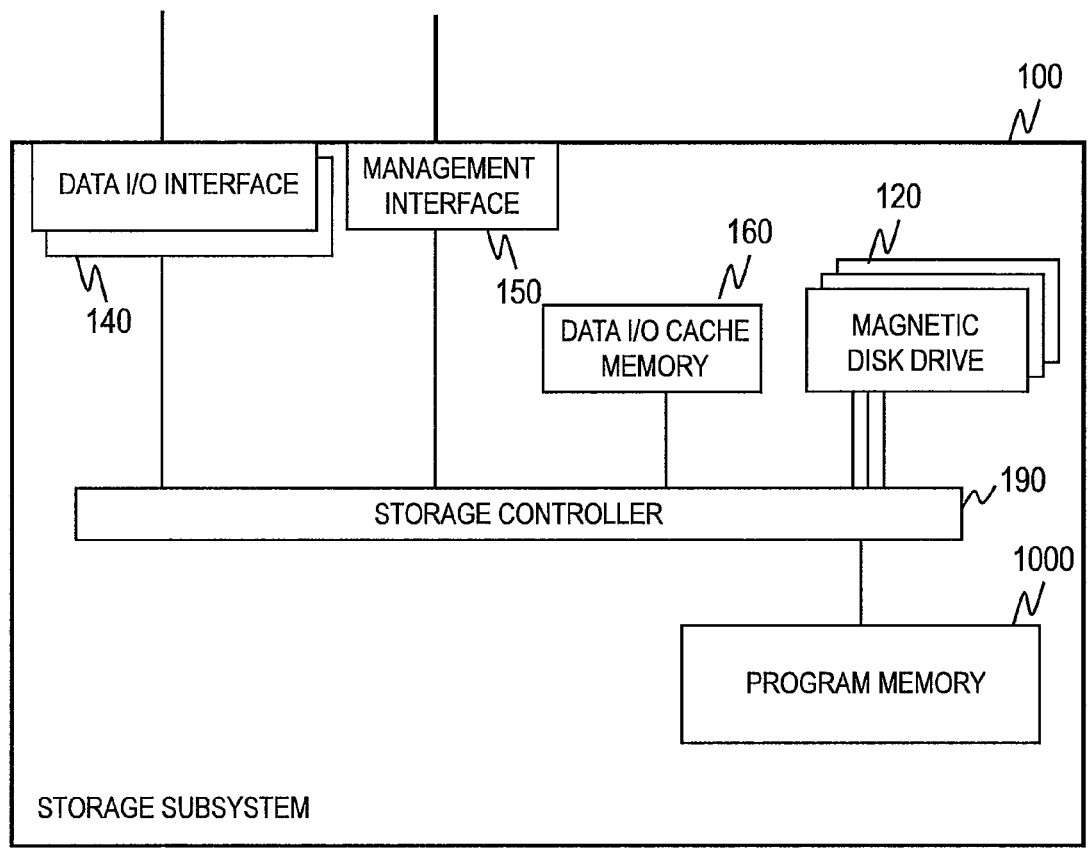
FIG. 2 is a diagram showing a configuration of a storage subsystem according to the embodiment of this invention.

FIG. 2 is a diagram showing the configuration of the storage subsystem 100 according to the embodiment of this invention.

The storage subsystem 100 contains a data input/output device 140, a management interface 150, a storage controller 190, a program memory 1000, a data input/output cache memory 160, and magnetic disk drives 120. The data input/output interface 140, the management interface 150, the program memory 1000, the data input/output cache memory 160, and the magnetic disk drives 120 are coupled to one another through the storage controller 190.

The data input/output interface 140 couples to the data archiving server 300 over the data input/output network 400. The management interface 150 couples to the management computer 500 over the management network 600. The storage subsystem 100 can have an arbitrary number of data input/output interfaces 140 and management interfaces 150. The data input/output interface 140 may not necessarily be a separate component from the management interface 150, and management information may be input/output through the data input/output interface 140 so that the data input/output interface 140 serves also as the management interface 150.

The storage controller 190 is equipped with a processor that controls the storage subsystem 100. The data input/output cache memory 160 is a temporary extent which speeds up data input/output access to storage extents. The data input/output cache memory 160 is commonly constituted of a volatile memory, but a non-volatile memory or a magnetic disk drive can substitute for a volatile memory as the data input/output cache memory 160. The number and capacity of the data input/output cache memory 160 are not limited. The magnetic disk drives 120 store data read/written by the client 200.

The program memory 1000 stores programs and control information necessary for processing that is executed in the storage subsystem 100. The program memory 1000 is constituted of a magnetic disk drive or a semiconductor memory. Control programs and control information stored in the program memory 1000 will be described later with reference to FIG. 5.

Figure 3:
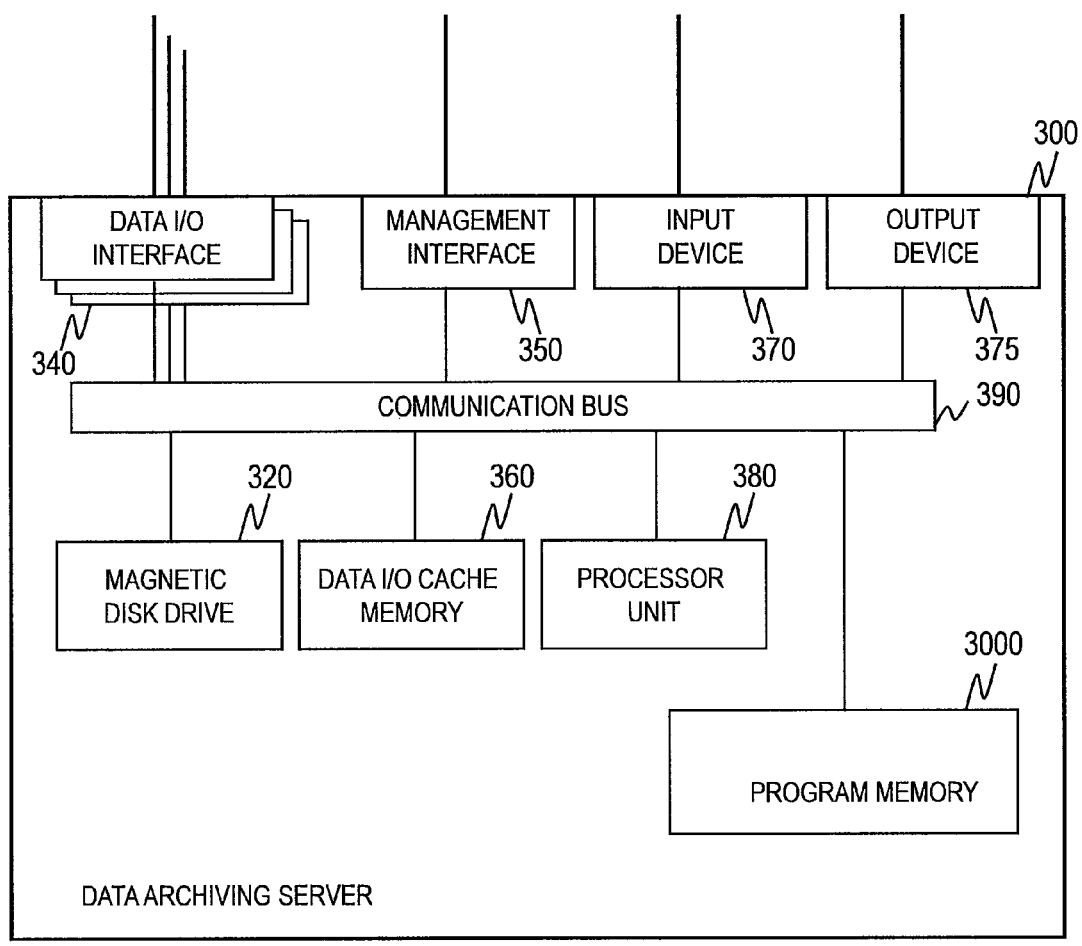
FIG. 3 is a diagram showing a configuration of a data archiving server according to the embodiment of this invention.

FIG. 3 is a diagram showing the configuration of the data archiving server 300 according to the embodiment of this invention.

The data archiving server 300 contains a data input/output device 340, a management interface 350, an input device 370, an output device 375, a processor unit 380, a magnetic disk drive 320, and a data input/output cache memory 360.

The data input/output interface 340, the management interface 350, the input device 370, the output device 375, the processor unit 380, the magnetic disk drive 320, and the data input/output cache memory 360 are coupled to one another via a communication bus 390. The hardware configuration of the data archiving server 300 can be implemented in a general-purpose computer (PC).

The data input/output interface 340 couples to the storage subsystem 100 and the client 200 over the data input/output network 400 to input/output data. The management interface 350 couples to the management computer 500 over the management network 600 to input/output management information. The data archiving server 300 can have an arbitrary number of data input/output interfaces 340 and management interfaces 350. The data input/output interface 340 may not necessarily be a separate component from the management interface 350, and management information may be input/output through the data input/output interface 340 so that the data input/output interface 340 serves also as the management interface 350.

The input device 370 couples to equipment with which a user enters information, for example, a keyboard and a mouse. The output device 375 couples to equipment through which information is output to the user, for example, a general-purpose display. The processor unit 380 executes various computations, and corresponds to a CPU or a processor. The magnetic disk drive 320 stores software such as an operating system and an application.

The data input/output cache memory 360 is constituted of a volatile memory or the like, and is used to speed up input and output of data to and from the storage extent distributed by the magnetic disk drive 320 or the storage subsystem 100. Although the data input/output cache memory 360 is implemented commonly by a volatile memory, a non-volatile memory or a magnetic disk drive may be employed instead. The number and capacity of the data input/output cache memory 360 are not limited.

The program memory 3000 stores programs and control information necessary for processing that is executed in the data archiving server 300. The program memory 3000 is constituted of a magnetic disk drive or a semiconductor memory. Control programs and control information stored in the program memory 3000 will be described later with reference to FIG. 6.

Figure 4:
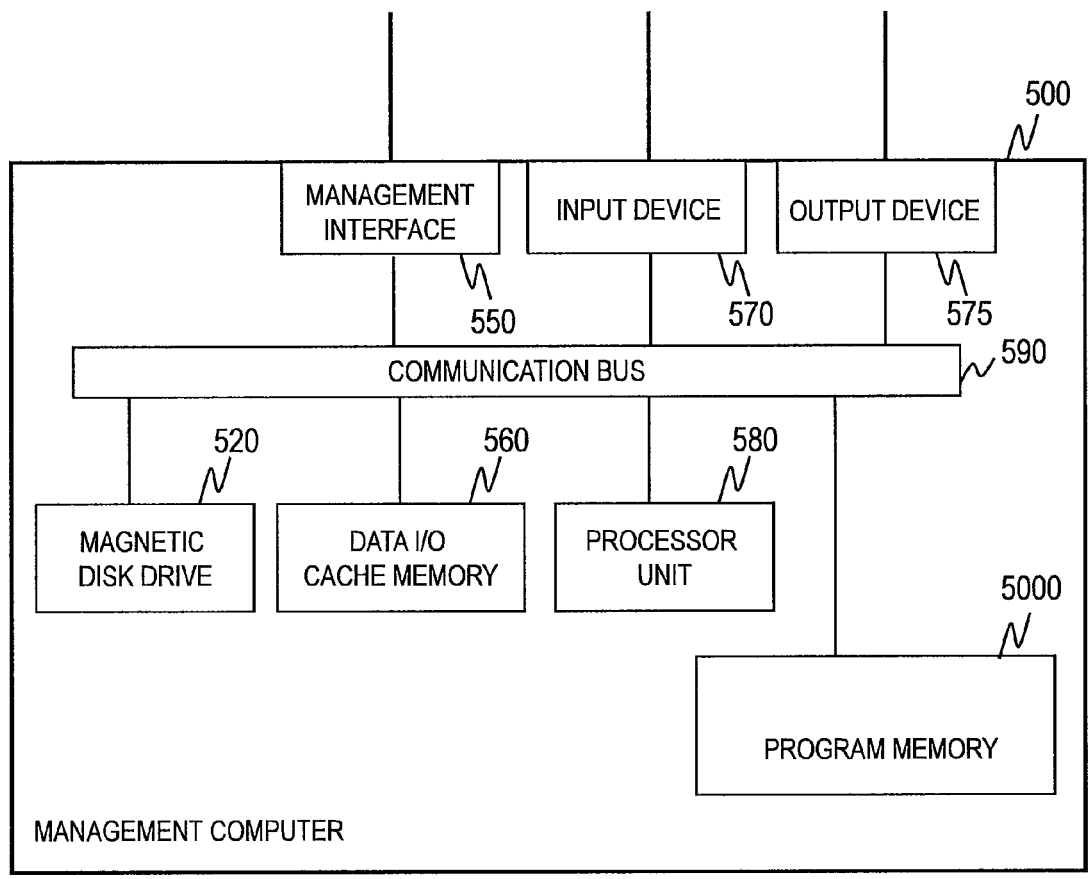
FIG. 4 is a diagram showing a configuration of a management computer according to the embodiment of this invention.

FIG. 4 is a diagram showing the configuration of the management computer 500 according to the embodiment of this invention.

The management computer 500 contains a management interface 550, an input device 570, an output device 575, a processor unit 580, a magnetic disk drive 520, a program memory 5000, and a data input/output cache memory 560.

The management interface 550, the input device 570, the output device 575, the processor unit 580, the magnetic disk drive 520, the program memory 5000, and the data input/output cache memory 560 are coupled to one another via a communication bus 590. The hardware configuration of the management computer 500 can be implemented in a general-purpose computer (PC). The functions of the components of the management computer 500 are the same as in the data archiving server 300 shown in FIG. 3.

The program memory 5000 stores programs and information necessary for processing that is executed in the management computer 500. The program memory 5000 is constituted of a magnetic disk drive or a semiconductor memory. Control programs and control information stored in the program memory 5000 will be described later with reference to FIG. 7.

Figure 5:
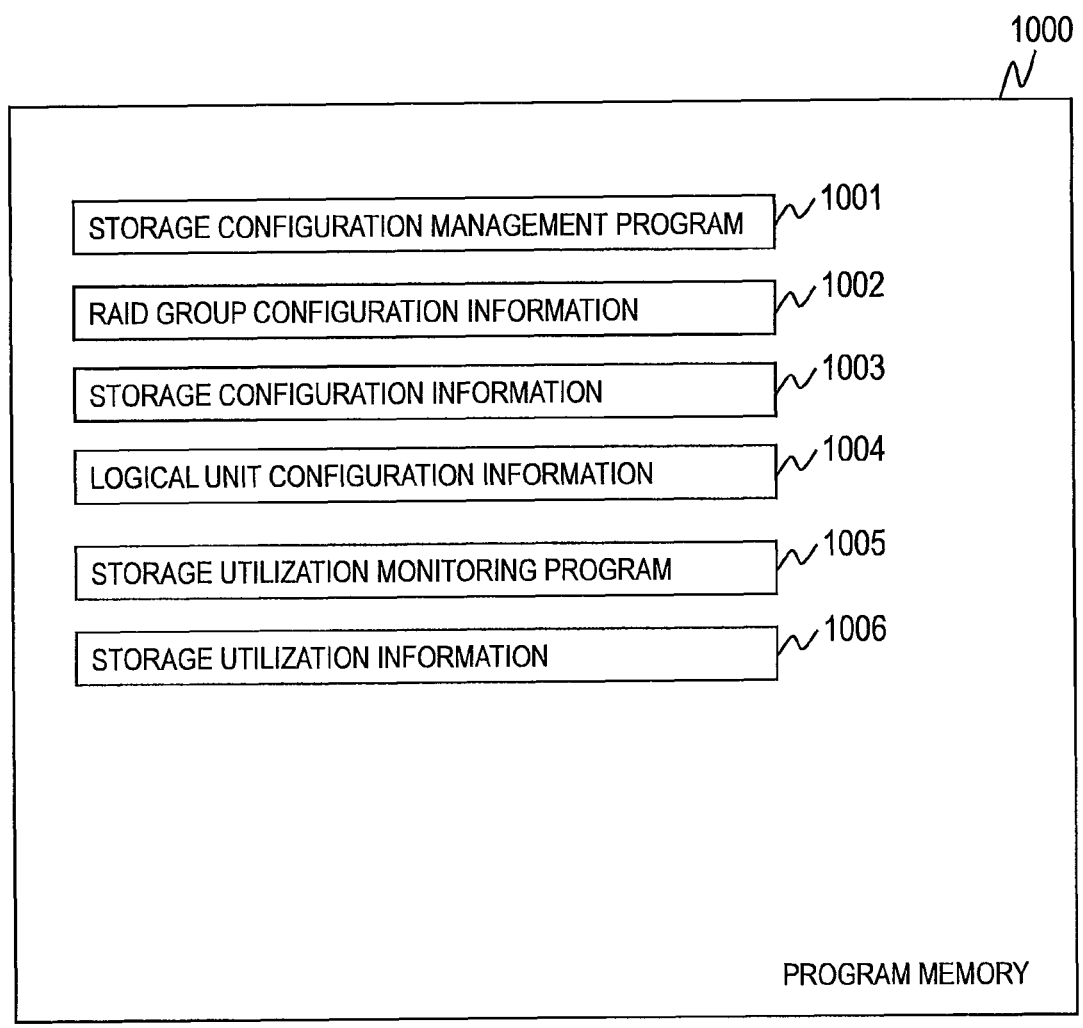
FIG. 5 is a diagram showing an example of control programs and control information that are stored in a program memory of each storage subsystem according to the embodiment of this invention.

FIG. 5 is a diagram showing an example of control programs and control information that are stored in the program memory 1000 of each storage subsystem 100 according to the embodiment of this invention.

The program memory 1000 contains a storage configuration management program 1001, RAID group configuration information 1002, storage configuration information 1003, logical unit configuration information 1004, a storage utilization monitoring program 1005, and storage utilization information 1006.

The storage configuration management program 1001 is executed by the processor installed in the storage controller 190 to manage and control storage extents provided to the data archiving servers 300 according to the storage configuration information 1003, which will be described later.

The RAID group configuration information 1002 is the configuration information of a RAID group which is made up of a group of magnetic disk drives 120. Details of the RAID group configuration information 1002 will be described later with reference to FIG. 9.

The storage configuration information 1003 is the configuration information of a storage extent that is obtained by logically partitioning a RAID group and that is used as the unit of storage resource. Details of the storage configuration information 1003 will be described later with reference to FIG. 10.

The logical unit configuration information 1004 is the configuration information of a logical unit, which is the unit of storage resource provided to the data archiving server 300. Details of the logical unit configuration information 1004 will be described later with reference to FIG. 11.

The storage utilization monitoring program 1005 is executed by the processor installed in the storage controller 190 to monitor situations in which the respective storage extents are utilized, and record obtained utilization information in the storage utilization information 1006. The storage utilization information 1006 is a record of utilization information of each storage extent such as the I/O command count, the amount of data read or written, the hard disk utilization ratio, and a response time. Details of the storage utilization information 1006 will be described later with reference to FIG. 12.

Figure 6:
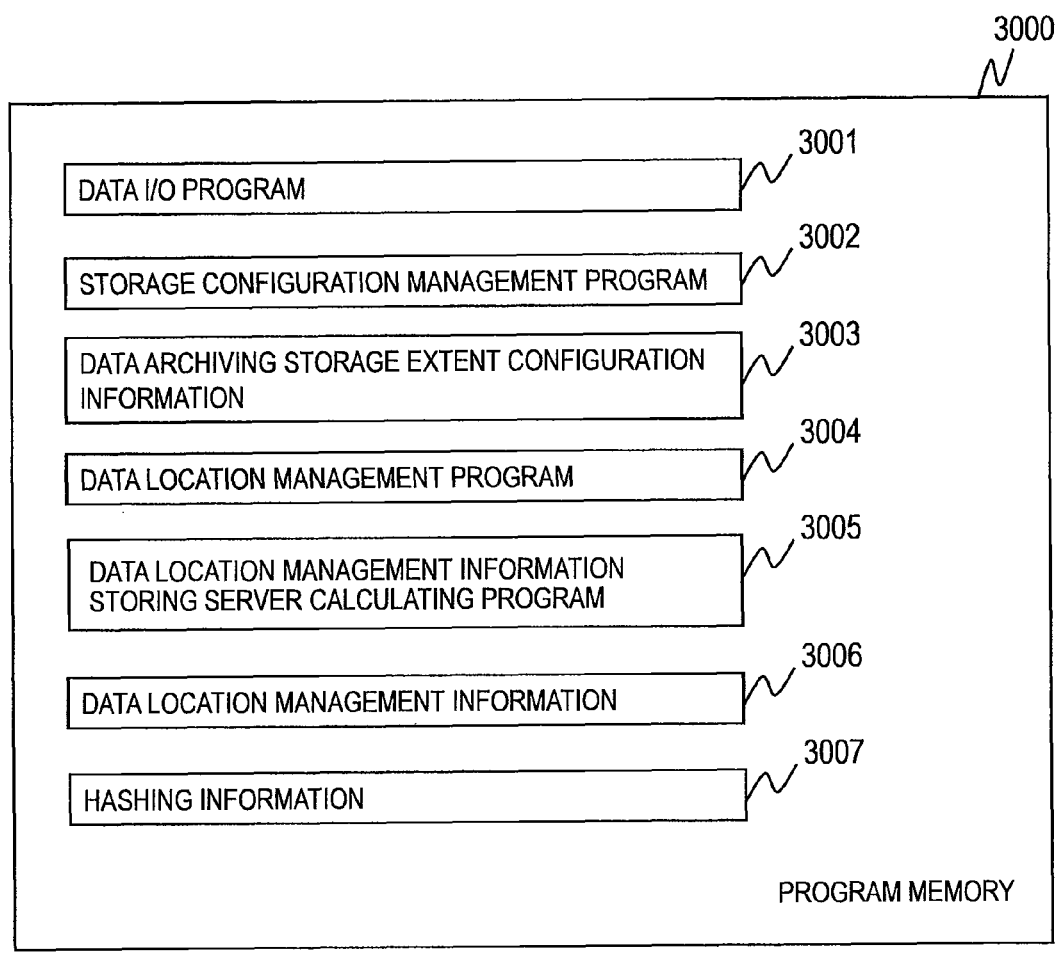
FIG. 6 is a diagram showing an example of control programs and control information that are stored in a program memory of each data archiving server according to the embodiment of this invention.

FIG. 6 is a diagram showing an example of control programs and control information that are stored in the program memory 3000 of each data archiving server 300 according to the embodiment of this invention.

The program memory 3000 contains a data I/O program 3001, a storage configuration management program 3002, data archiving storage extent configuration information 3003, a data location management program 3004, a data location management information storing server calculating program 3005, data location management information 3006, and hashing information 3007.

The data I/O program 3001 is executed by the processor unit 380 of the data archiving server 300 to read or write data in the storage subsystems 100 as requested by the clients 200 and sends a result of the processing to the clients 200 in response.

As described above, the data archiving servers 300 mount storage extents (logical units) provided by the storage subsystems 100 and present the mounted storage extents to the clients 200. The storage configuration management program 3002 manages the mounted storage extents.

The data archiving storage extent configuration information 3003 holds information on the configuration of a data archiving storage extent mounted to the data archiving server 300. Specifically, the data archiving storage extent configuration information 3003 holds the association between a data archiving storage extent and a logical unit. Details of the data archiving storage extent configuration information 3003 will be described later with reference to FIG. 13.

The data location management program 3004 is executed by the processor unit 380 of the data archiving server 300 to identify the storage location of data requested by the clients 200 with the use of the data location management information storing server calculating program 3005 and the data location management information 3006. When new data is archived, the data location management program 3004 also chooses in which storage extent the data is to be stored.

The data location management information storing server calculating program 3005 is executed by the processor unit 380 of the data archiving server 300 to identify which data archiving server 300 is storing the data location management information 3006 where the storage location of requested data is recorded. The data location management information storing server calculating program 3005 identifies this data archiving server 300 by, for example, performing hashing for the requested data and using the calculated hash value and the hashing information 3007. Specific procedures of the calculation will be described in a description of file archive location identifying processing which will be given with reference to FIG. 19.

The data location management information 3006 holds the name of a file and the data archiving server 300 and a data archiving storage extent that are storing the file. Details of the data location management information 3006 will be described later with reference to FIG. 14.

The hashing information 3007 is used by the data location management information storing server calculating program 3005 to identify which data archiving server 300 is storing the relevant data location management information 3006, and holds the association between a hash value and the data archiving server 300. Details of the hashing information 3007 will be described later with reference to FIG. 15.

Figure 7:
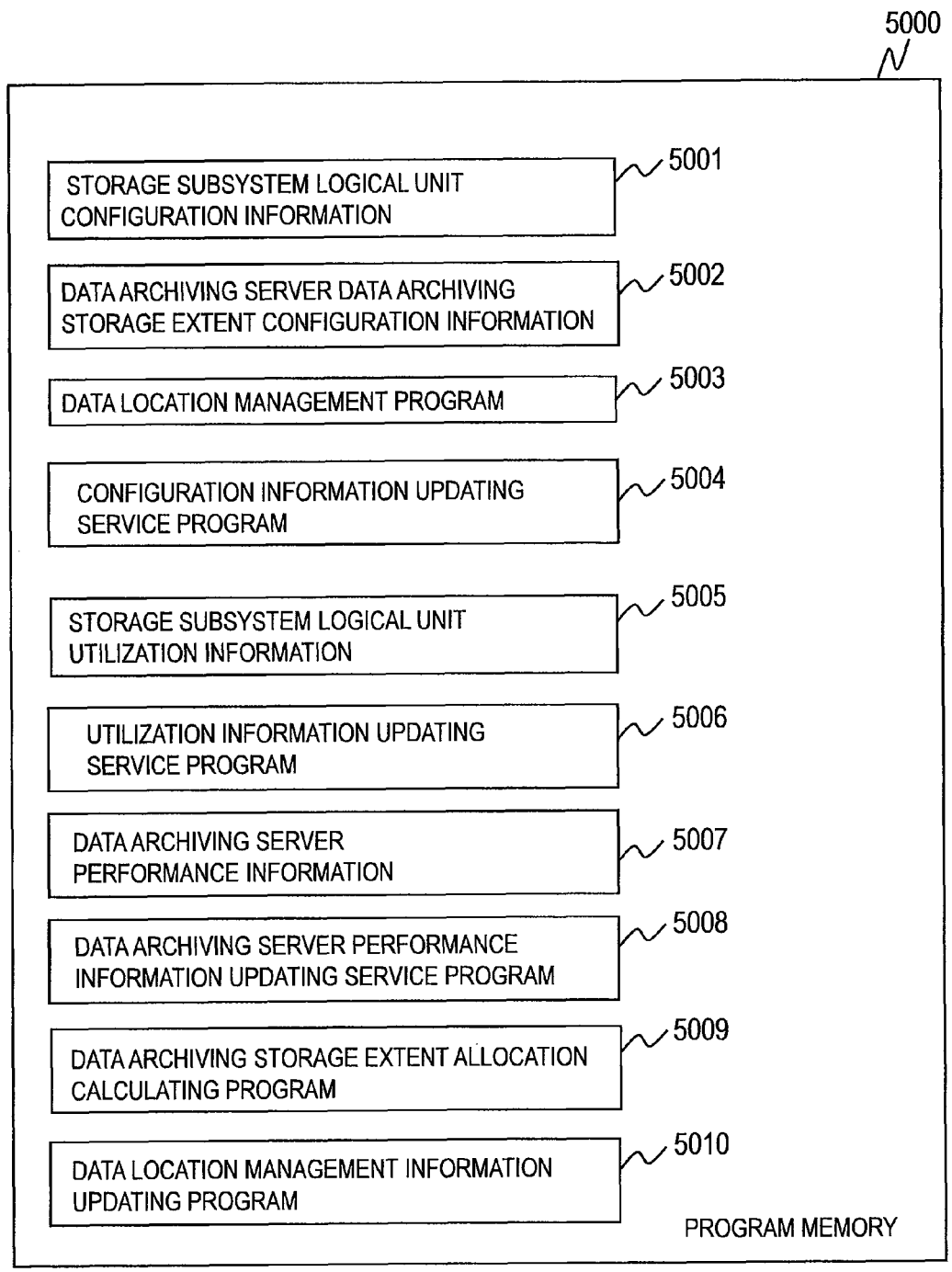
FIG. 7 is a diagram showing an example of control programs and control information that are stored in a program memory of the management computer according to the embodiment of this invention.

FIG. 7 is a diagram showing an example of control programs and control information that are stored in the program memory 5000 of the management computer 500 according to the embodiment of this invention.

Storage subsystem logical unit configuration information 5001 corresponds to the logical unit configuration information 1004 stored in each storage subsystem 100. Data archiving server data archiving storage extent configuration information 5002 corresponds to the data archiving storage extent configuration information 3003 stored in each data archiving server 300.

A configuration information updating service program 5004 is executed by the processor unit 580 of the management computer 500 to communicate with the storage subsystems 100 and the data archiving servers 300 periodically and keep the storage subsystem logical unit configuration information 5001 and the data archiving server data archiving storage extent configuration information 5002 up to date.

Storage subsystem logical unit utilization information 5005 is utilization information that is obtained by compiling for each logical unit the storage utilization information 1006 stored in the respective storage subsystems 100. Details of the storage subsystem logical unit utilization information 5005 will be described later with reference to FIG. 16.

A utilization information updating service program 5006 is executed by the processor unit 580 of the management computer 500 to communicate with the storage subsystems 100 periodically and keep the storage subsystem logical unit utilization information 5005 up to date.

Data archiving server performance information 5007 is information containing ranking that is determined by an administrator based on the performance of the data archiving servers 300. The performance of the data archiving servers 300 may be measured by, for example, the processing performance of the processor unit 380 or the processing performance of the data I/O interface 340. Details of the data archiving server performance information 5007 will be described later with reference to FIG. 17.

A data archiving server performance information updating service program 5008 is executed by the processor unit 580 of the management computer 500 to update or manage the data archiving server performance information 5007.

A data archiving storage extent allocation calculating program 5009 is executed by the processor unit 580 of the management computer 500 to calculate the allocation of data archiving storage extents in a manner that optimizes the balance between the performance of the data archiving servers 300 and the load on the logical units. For instance, the data archiving server 300 whose performance is higher than that of any other data archiving server 300 is associated with a data archiving storage extent that has the heaviest load.

A data location management information updating program 5010 is executed by the processor unit 580 of the management computer 500 to instruct the data archiving servers 300 to update the data location management information 3006.

Now, the configuration of the data archiving system will be described with reference to FIG. 8 and the configuration information of the data archiving system shown in FIG. 8 will be described with reference to FIGS. 9 to 17.

Figure 8:
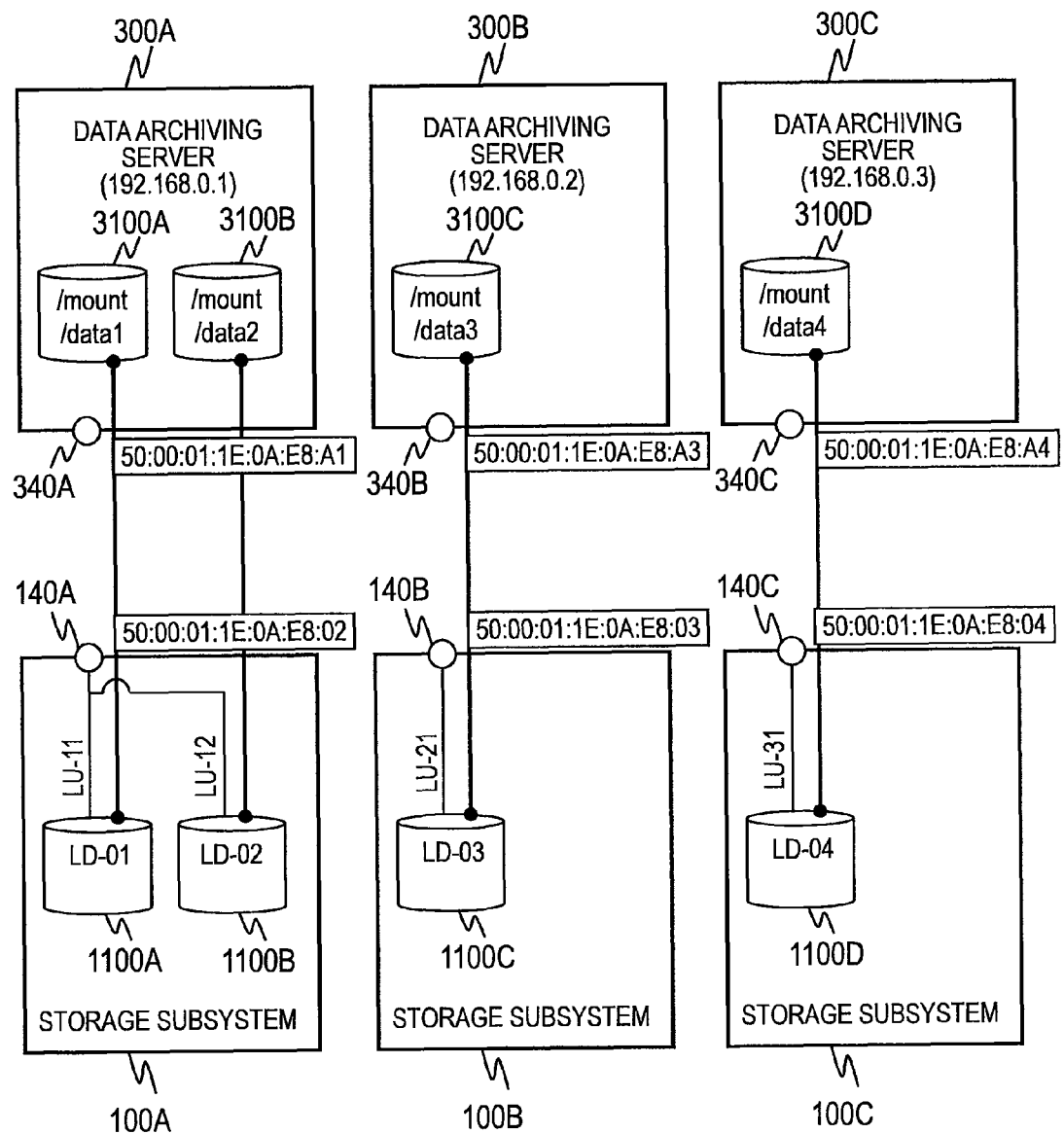
FIG. 8 is a diagram showing an example of the configuration of the data archiving system according to the embodiment of this invention.

FIG. 8 is a diagram showing an example of the configuration of the data archiving system according to the embodiment of this invention.

The data archiving system shown in FIG. 8 contains data archiving servers 300A, 300B, and 300C and storage subsystems 100A, 100B, and 100C. When the data archiving system contains a plurality of data archiving servers 300 and a plurality of storage subsystems 100 as shown in FIG. 8 and these components need to be identified individually, each component is given a reference numeral with an alphabet letter suffix. For example, individual data archiving servers 300 are denoted by 300A, 300B, and 300C. In a description of a configuration or processing that is common to identical components, a reference numeral without an alphabet letter suffix is used (e.g., "data archiving server 300").

The data I/O interface 340A of the data archiving server 300A is coupled to the data I/O interface 140A of the storage subsystem 100A through the data I/O network 400. Similarly, the data archiving server 300B is coupled to the storage subsystem 100B and the data archiving server 300C is coupled to the storage subsystem 100C.

The data I/O interface 140A of the storage subsystem 100A is identified by identification information "50:00:01:1E:0A:E8:02". Logical units registered to the data I/O interface 140A of the storage subsystem 100A are a logical unit 1100A, which is identified by "LU-11", and a logical unit 1100B, which is identified by "LU-12". The logical unit 1100A is composed of a logical storage extent that is identified by "LD-01" whereas the logical unit 1100B is composed of a logical storage extent that is identified by "LD-02". The above configuration is defined in the logical unit configuration information 1004 shown in FIG. 11.

The logical unit configuration information 1004 further holds the association between the data I/O interface 140 of one storage subsystem 100 and the data I/O interface 340 of the data archiving server 300 that has access to this storage subsystem 100. Specifically, the data I/O interface 140A of the storage subsystem 100A is associated with the data I/O interface 340A (identification information "50:00:01:1E:0A:E8:A1") of the data archiving server 300A. The logical units 1100A and 1100B are accordingly accessible to the data archiving server 300A, which is identified by "192.168.0.1".

The data archiving server 300A mounts the logical unit 1100A to a data archiving storage extent 3100A, which is identified by "/mount/data1", to provide the logical unit to the clients 200. Similarly, the logical unit 1100B is mounted to a data archiving storage extent 3100B, which is identified by "/mount/data2". The relation between a logical unit and a data archiving storage extent is defined in the data archiving storage extent configuration information 3003 shown in FIG. 13.

The data archiving storage extent configurations of the data archiving servers 300B and 300C are defined in a similar manner. Configuration information for constructing the data archiving system of FIG. 8 will be described below.

FIG. 9 is a diagram showing an example of the RAID group configuration information 1002 which is stored in each storage subsystem 100 according to the embodiment of this invention.

The RAID group configuration information 1002 holds the association relation between a RAID group and magnetic disk drives that constitute the RAID group. The RAID group configuration information 1002 contains in each record entry RAID group identification information 10021 and magnetic disk drive identification information 10022.

The RAID group identification information 10021 indicates an identifier for uniquely identifying each RAID group set up in the storage subsystem 100.

The magnetic disk drive identification information 10022 indicates identifiers for uniquely identifying the magnetic disk drives 120 that constitute a RAID group identified by the RAID group identification information 10021. For example, a RAID group "RG-01" is constituted of magnetic disk drives "HD-01", "HD-02", "HD-03", and "HD-04".

FIG. 10 is a diagram showing an example of the storage configuration information 1003 which is stored in the storage subsystem 100 according to the embodiment of this invention.

The storage configuration information 1003 contains a storage extent identification information 10031, RAID group identification information 10032, a starting block address 10033, and an ending block address 10034.

The storage extent identification information 10031 is an identifier by which a storage extent is identified. The RAID group identification information 10032 is an identifier by which a RAID group is identified. A storage extent identified by the storage extent identification information 10031 is a logical storage extent defined to belong to a RAID group that is identified by the RAID group identification information 10032.

The starting block address 10033 is the starting block address of a physical area in which a storage extent that is identified by the storage extent identification information 10031 is stored. The ending block address 10034 is the ending block address of a physical area in which a storage extent that is identified by the storage extent identification information 10031 is stored.

FIG. 11 is a diagram showing an example of the logical unit configuration information 1004 that is stored in the storage subsystem 100 according to the embodiment of this invention.

The logical unit configuration information 1004 defines the association among the data I/O interface 140 of the storage subsystem 100, a storage extent, and an external interface that has access to the storage extent.

The logical unit configuration information 1004 contains communication interface identification information 10041, storage unit identification information 10042, storage extent identification information 10043, and access-permitted communication interface identification information 10044.

The communication interface identification information 10041 is an identifier for uniquely identifying the data input/output interface 140 of each storage subsystem 100. For example, world wide name (WWN) is stored as the communication interface identification information 10041.

The storage unit identification information 10042 indicates an identifier for uniquely identifying each logical unit. A logical unit is the unit of storage resource accessible to the data archiving server 300 that is coupled to the storage subsystem 100. The data archiving server 300 mounts a logical unit and provides the logical unit as a data archiving storage extent to the clients 200.

The storage extent identification information 10043 is an identifier for uniquely identifying each logical storage extent provided by the storage subsystem 100.

The access-permitted communication interface identification information 10044 is information for identifying a communication interface of a device that is permitted to access to a storage unit identified by the storage unit identification information 10042. By defining the access-permitted communication interface identification information 10044, only specific data archiving servers 300 are allowed to access, which improves the security.

FIG. 12 is a diagram showing an example of the storage utilization information 1006 which is stored in the storage subsystem 100 according to the embodiment of this invention.

The storage utilization information 1006 holds a utilization state 10062 for each measurement point in time 10061. Results of monitoring the utilization of each storage extent are recorded in the storage utilization information 1006 in time series.

The time 10061 is information indicating a time point at which utilization situations have been recorded. The utilization state 10062 is specifically a performance index such as the input/output request count (I/O count), the amount of data read and written (GB or MB/sec), the hard disk utilization ratio (%), or a response time (ms). The utilization state 10062 in the storage utilization information 1006 of FIG. 12 is the input/output request count (I/O count) during a given period.

FIG. 13 is a diagram showing an example of the data archiving storage extent configuration information 3003 which is stored in each data archiving server 300 according to the embodiment of this invention.

The data archiving storage extent configuration information 3003 contains in each record entry data archiving storage extent identification information 30031, communication interface identification information 30032, storage unit identification information 30033, an occupied capacity ratio 30034, and a transferred data amount 30035.

The data archiving storage extent identification information 30031 indicates a mount point of a file system run by the data archiving server 300. The data archiving storage extent identification information 30031 is identification information used for referring on the file system to logical units provided by the storage subsystems 100.

The communication interface identification information 30032 indicates an identifier for uniquely identifying the data I/O interface 140 of each storage subsystem 100.

The storage unit identification information 30033 indicates an identifier for uniquely identifying a logical unit that is registered to the data I/O interface 140 identified by the communication interface identification information 30032. In other words, the substance of a data archiving storage extent provided by the data archiving server 300 is a logical unit coupled to the data archiving storage extent over the data I/O network 400 and registered to the data I/O interface 140 of the associated storage subsystem 100.

The occupied capacity ratio 30034 is the ratio of the amount of recorded data in capacity to the capacity of a data archiving storage extent identified by the data archiving storage extent identification information 30031. The transferred data amount 30035 is the amount of data read and written in the identified data archiving storage extent. The occupied capacity ratio 30034 and the transferred data amount 30035 are referred to when, for example, selecting a data archiving storage extent where new data is to be stored.

FIG. 14 is a diagram showing an example of the data location management information 3006 which is stored in each data archiving server 300 according to the embodiment of this invention.

The data location management information 3006 contains in each record entry file identification information 30061, data archiving server identification information 30062, and data archiving storage extent identification information 30063.

The file identification information 30061 is identification information for identifying a file that is associated with archived data, specifically, the name of the file.

The data archiving server identification information 30062 is identification information of the data archiving server 300 that is archiving this data. In the embodiment of this invention, each data archiving server 300 is identified by an IP address assigned to a communication interface of the data archiving server 300.

The data archiving storage extent identification information 30063 indicates an identifier for uniquely identifying a data archiving storage extent that is storing this data.

Accordingly, data managed by the data archiving system corresponds to a file that is stored in a data archiving storage extent identified by the data archiving storage extent identification information 30063 and managed by the data archiving server 300 identified by the data archiving server identification information 30062, and that is identified by the file identification information 30061.

FIG. 15 is a diagram showing an example of the hashing information 3007 which is stored in each data archiving server 300 according to the embodiment of this invention.

The hashing information 3007 contains in each record entry server identification information 30071 and server search calculation information 30072.

The server identification information 30071 is identification information of the data archiving server 300 that is storing the data location management information 3006 where the storage location of data (file) requested to be read or archived is stored (the server is called a data location management information storing server). The server search calculation information 30072 indicates a hash value associated with each data archiving server 300.

Upon reception of a file read or archive request, the data archiving server 300 uses the data location management information storing server calculating program 3005 to calculate a hash value from the file name of the requested file. The data archiving server 300 then looks up the hashing information 3007 for a record entry whose server search calculation information 30072 matches the calculated hash value and obtains the server identification information 30071 from this entry, thereby identifying the data location management information storing server.

FIG. 16 is a diagram showing an example of the storage subsystem logical unit utilization information 5005 which is stored in the management computer 500 according to the embodiment of this invention.

The storage subsystem logical unit utilization information 5005 is obtained by compiling the storage utilization information 1006 collected by the respective storage subsystems 100. Specifically, the management computer 500 executes the utilization information updating service program 5006 to collect the storage utilization information 1006 from each storage subsystem 100.

The storage subsystem logical unit utilization information 5005 holds a utilization state 50052 for each measurement point in time 50051 and for each storage extent.

The time 50051 is information indicating a time point at which utilization situations have been recorded. The utilization state 50052 is specifically a performance index such as the input/output request count (I/O count), the amount of data read and written (GB or MB/sec), the hard disk utilization ratio (%), or a response time (ms). The utilization state 50052 in the storage subsystem logical unit utilization information 5005 of FIG. 16 is the input/output request count (I/O count) during a given period.

FIG. 17 is a diagram showing an example of the data archiving server performance information 5007 which is stored in the management computer 500 according to the embodiment of this invention.

The data archiving server performance information 5007 is information about the performance of the data archiving servers 300. The data archiving server performance information 5007 contains in each record entry a data I/O performance rank 50071, data archiving server identification information 50072, and communication interface identification information 50073.

The data I/O performance rank 50071 is an index indicating the performance of each data archiving server 300. The data archiving server identification information 50072 is identification information of each data archiving server 300. The communication interface identification information 50073 is identification information of a communication interface that is installed in the data archiving server 300 identified by the data archiving server identification information 50072.

The data archiving server performance information 5007 shown in FIG. 17 ranks the performance of the data I/O interface 340 of each data archiving server 300 and registers the order as the data I/O performance rank 50071.

The data archiving server performance information 5007 is defined by the administrator in the embodiment of this invention. Alternatively, the performance of the data archiving servers 300 may be dynamically ranked based on, for example, the performance of the processor unit 380 or data I/O interface 340 of each data archiving server 300.

Described above is the configuration of the embodiment of this invention. What follows is a description of processing executed in the embodiment of this invention. An outline of the processing will be described first with reference to FIG. 18, and then details thereof will be described with reference to flow charts of FIGS. 19 to 31.

Figure 18:
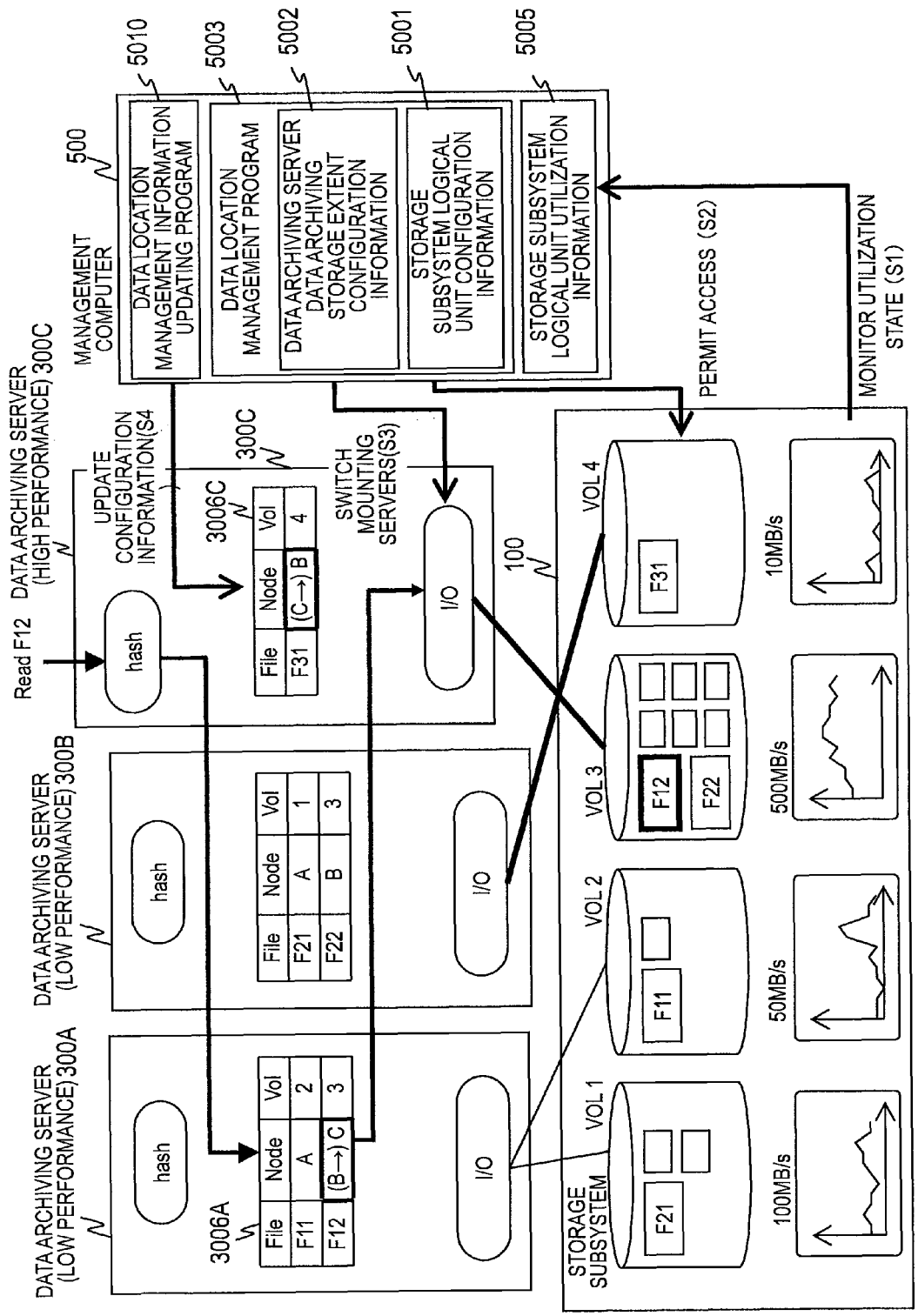
FIG. 18 is a diagram outlining steps of managing performance of a data archiving system according to the embodiment of this invention.

FIG. 18 is a diagram outlining steps of managing the performance of a data archiving system according to the embodiment of this invention.

The data archiving system shown in FIG. 18 contains the management computer 500, three data archiving servers (300A to 300C), and the storage subsystem(s) 100. The data archiving servers 300A and 300B have relatively low performance, and the data archiving server 300C has relatively high performance. The storage subsystem(s) 100 provide volumes 1 to 4. Each volume is associated with a logical unit.

Processing of reading a specified file out of the data archiving system will be described first.

To read a file out of the data archiving system according to the embodiment of this invention, the clients 200 can send a file reading request to any of the data archiving servers 300. The description given here takes as an example a case in which a request to read a file "F12" is sent from one client 200 to the data archiving server 300C as shown in FIG. 18.

The data archiving server 300C first identifies a data location management information storing server which manages the storage location of the file "F12" requested to be read. The data archiving system is set up such that the data location management information storing server is uniquely determined from, for example, the file name. How the data location management information storing server is specifically identified will be described later. The data location management information storing server in this example is the data archiving server 300A.

A reference to the data location management information 3006 of the data archiving server 300A (denoted by 3006A) reveals that the file "F12" is managed by the data archiving server 300C. The data archiving server 300C accordingly reads the file "F12" out of the volume 3 mounted to itself, and sends the read file to the client 200.

The clients 200 can thus read a requested file by requesting any data archiving server 300 to read the file without being aware of where the file is archived.

Described next are steps of changing the configuration of the data archiving system according to the performance of the data archiving servers 300 and the load on volumes provided by the storage subsystem(s) 100. The data archiving system of FIG. 18 is after a configuration change prior to which the data archiving server 300B is coupled to the volume 3 whereas the data archiving server 300C is coupled to the volume 4. Steps of changing the data archiving system configuration in this setting will be described.

First, the management computer 500 monitors utilization situations (load) of each volume (Step S1). The load on a volume is recorded in the storage subsystem logical unit utilization information 5005 by executing the utilization information updating service program 5006 as described above.

In the example of FIG. 18, the load on the volume 3 is heavy whereas the load on the volume 4 is light. FIG. 18 shows utilization situations of each volume under the volume in terms of transferred data amount per unit time.

Before the configuration change, the heavy-load volume 3 is coupled to the low-performance data archiving server 300B, and the data archiving server 300B may be incapable of keeping up with the heavy load, thereby lowering the overall performance of the data archiving system, while the high-performance data archiving server 300C, which is coupled to the light-load volume 4, is not used to its full capacity.

Then, the balance between the performance and the load is improved by coupling the light-load volume 4 to the low-performance data archiving server 300B and coupling the heavy-load volume 3 to the high-performance data archiving server 300C. Combinations of data archiving servers and volumes involved in a configuration change are determined based on the performance of data archiving servers and utilization situations of volumes. For example, a data archiving server coupled to a volume where the load is heavy for the processing performance of the data archiving server and a data archiving server coupled to a volume where the load is light for the processing performance of the data archiving server are selected to switch their couplings with each other.

To change the data archiving system configuration, the management computer 500 first executes the data location management program 5003 to request the relevant storage subsystem 100 to permit the data archiving server 300 that is newly coupled to a volume in question access to the volume (Step S2). Specifically, the management computer 500 requests the storage subsystem 100 to permit the data archiving server 300C to access to the volume 3 and the data archiving server 300B access to the volume 4.

The management computer 500 then executes the data location management program 5003 to instruct the data archiving server 300 to mount the newly allocated volume (Step S3). Specifically, the management computer 500 instructs the data archiving server 300B to mount the volume 4 and the data archiving server 300C to mount the volume 3. The function of mounting a volume is provided to each data archiving server 300 by an operating system (OS) that is run on the data archiving server 300.

Lastly, the management computer 500 updates the configuration information in the data archiving servers 300 with the changed configuration (Step S4). Specifically, the management computer 500 executes the data location management information updating program 5010 to instruct the data archiving servers 300 to update their respective data location management information 3006. In FIG. 18, the server that manages the file "F12" is changed from the data archiving server 300B to the data archiving server 300C in the data location management information 3006A of the data archiving server 300A. Similarly, in the data location management information 3006 of the data archiving server 300C (denoted by 3006C), the server that manages a file "F31" is changed from the data archiving server 300C to the data archiving server 300B.

The configuration of the data archiving system is changed through the above processing. More detailed processing steps of updating the configuration information will be described with reference to FIGS. 25 to 31. Before discussing the configuration information updating processing in detail, data archiving processing (FIGS. 19 and 20), data reading processing (FIGS. 21 and 22), the configuration information updating processing (FIG. 23), and utilization information updating processing (FIG. 24) will be described with reference to the drawings.

Figure 19:
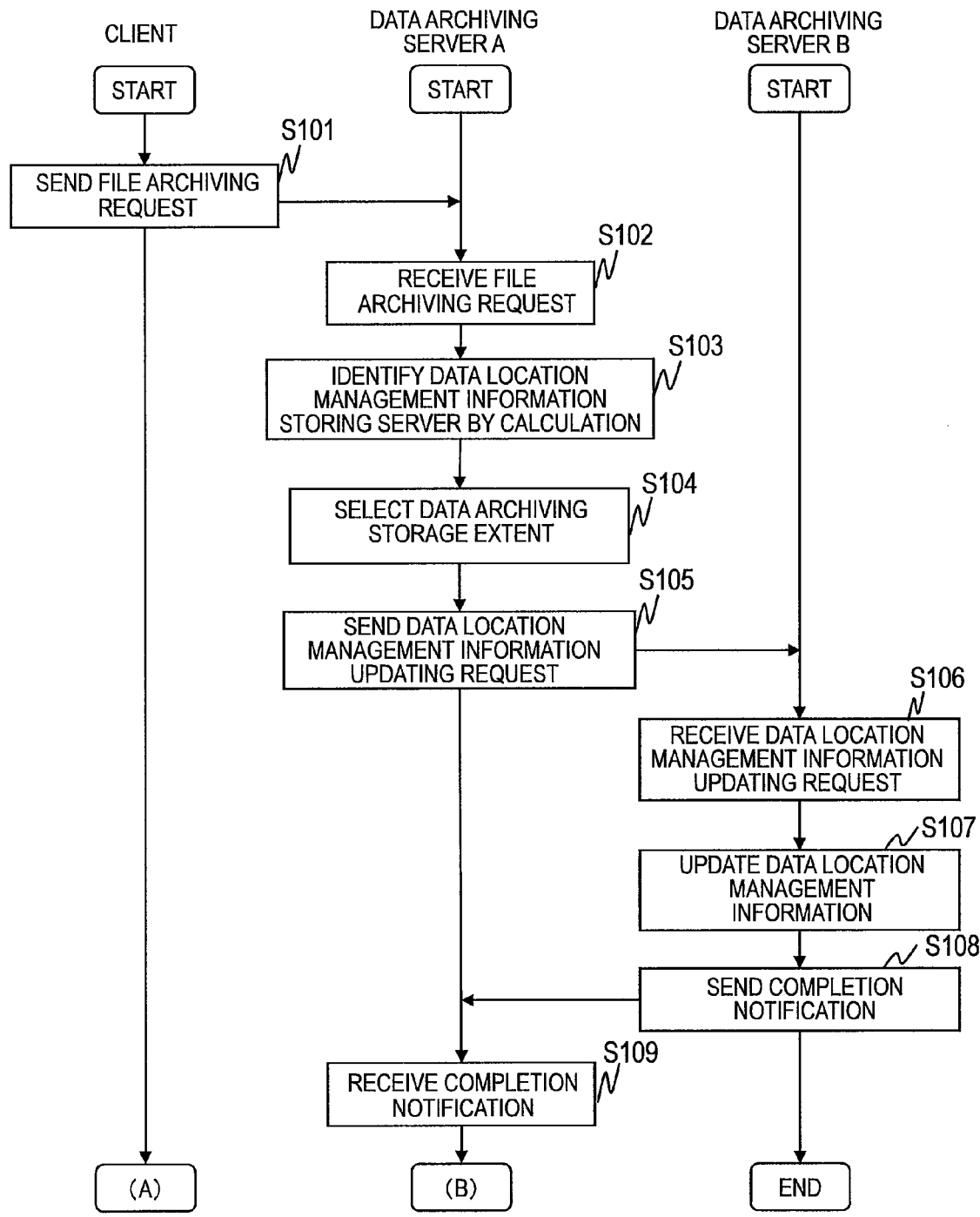
FIG. 19 is flow charts showing steps of data archiving processing in the data archiving system according to the embodiment of this invention.
Figure 20:
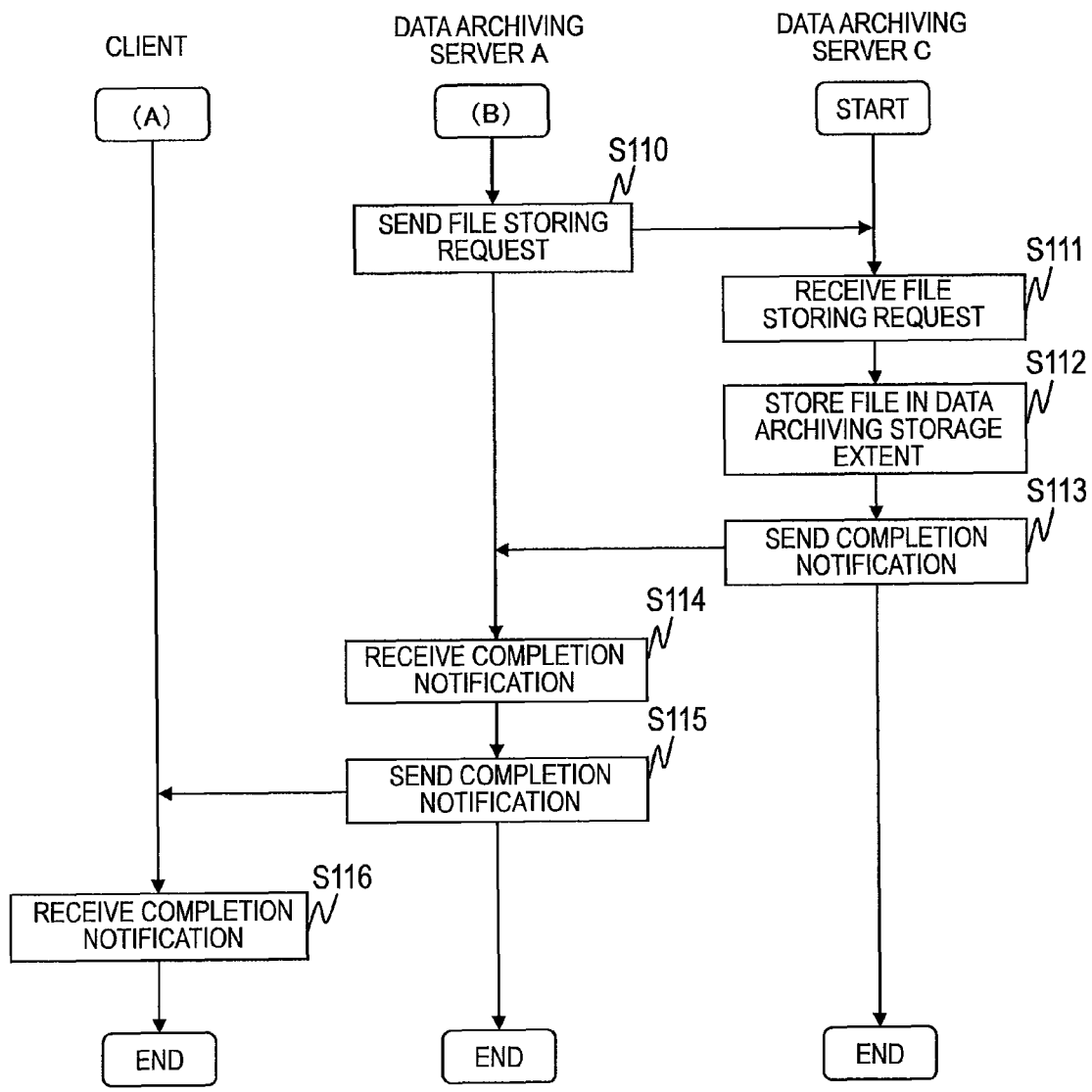
FIG. 20 is flow charts showing steps of data archiving processing in the data archiving system according to the embodiment of this invention.

FIGS. 19 and 20 are flow charts showing steps of data archiving processing in the data archiving system according to the embodiment of this invention. Steps shown in FIG. 19 are mainly for identifying where data is archived and updating the data location management information. Steps shown in FIG. 20 are mainly for actually archiving a file.

The client 200 who wishes to archive file data in the data archiving system sends a file archiving request message to any data archiving server 300 contained in the data archiving system (Step S101). The file archiving request message contains file data to be archived. Hereinafter, the data archiving server 300 to which the request is sent is referred to as data archiving server A.

The processor unit 380 of the data archiving server A receives the file archiving request message (Step S102) and executes the data location management program 3004. The data location management information storing server calculating program 3005 is then used to identify the data location management information storing server which stores the data location management information 3006 where the storage location of the file data to be archived is defined (Step S103).

How the data location management information storing server is identified by calculation will be described. A simple calculation method is to perform hashing from the file data to be archived. For example, a numerical value is calculated that is uniquely determined by performing hashing with the file name or part of the data as an input value. The remainder of the division of the calculated numerical value by the count of the data archiving servers 300 is a numerical value smaller than the count of the data archiving servers 300. If each data archiving server 300 is associated with a value from 0 to the count of the data archiving servers 300 minus 1 in advance, the result of the calculation by the data location management information storing server calculating program 3005 can be linked to one of the data archiving servers 300.

To give a more specific description, when the file name of the data to be archived is "0016.dat" and a hash value calculated from this file name is "3728", the remainder of the division of the calculated hashed value by the count of the data archiving servers 300 (three) is "2". In the hashing information 3007 of FIG. 15, the data location management information storing server that is associated with a hash value "2" is the data archiving server 300 that is identified by identification information "192.168.0.3".

The above calculation for identifying the data location management information storing server produces the same result in any of the data archiving servers 300. Therefore, whichever data archiving server 300 receives an I/O request from the client 200, the data location management information storing server is uniquely identified, and the client 200 can make a processing request to any data archiving server 300.

The processor unit 380 of the data archiving server A next executes the data location management program 3004 to select the data archiving server 300 and the data archiving storage extent 3100 where the requested data is to be stored and archived (Step S104). A standard employed in the selection process is, for example, to choose the data archiving storage extent 3100 that has a low occupied capacity ratio according to the occupied capacity ratio 30034 of the data archiving storage extent configuration information 3003. The selection process may be based on the load on the data archiving storage extents 3100 instead of capacity.

For instance, the processor unit 380 may choose the data archiving storage extent 3100 that has a small transferred data amount according to the transferred data amount 30035 of the data archiving storage extent configuration information 3003. The processor unit 380 may also choose the data archiving storage extent 3100 that has a low disk access frequency per unit time according to the storage subsystem logical unit utilization information 5005.

The processor unit 380 of the data archiving server A next uses the data location management program 3004 to send a data location management information updating request in which the "file name" of the file requested in Step S102 and the data archiving server 300 and data archiving storage extent 3100 chosen in Step S104 are recorded, to the data location management information storing server identified in Step S103 (Step S105). Hereinafter, the data location management information storing server to which the request is sent is referred to as data archiving server B.

The processor unit 380 of the data archiving server B receives the data location management information updating request (Step S106), and uses the data location management program 3004 to add a new entry to the data location management information 3006 (Step S107). After Step S107 is completed, the processor unit 380 of the data archiving server B sends a completion notification to the data archiving server A (Step S108).

The processor unit 380 of the data archiving server A receives the completion notification (Step S109) and uses the data location management program 3004 to send a file storing request message to the data archiving server 300 that manages the data archiving storage extent 3100 chosen in Step S104 (Step S110). Hereinafter, the data archiving server 300 to which the request is sent is referred to as data archiving server C.

The processor unit 380 of the data archiving server C receives the file storing request message (Step S111) and uses the data I/O program 3001 to store the received data in the requested data archiving storage extent 3100 (Step S112). After finishing storing the data, the processor unit 380 of the data archiving server C sends a completion notification to the data archiving server A (Step S113).

The processor unit 380 of the data archiving server A receives the completion notification sent from the data archiving server C (Step S114) and sends a completion notification to the client 200 who has made the archiving request (Step S115). The client 200 receives the completion notification (Step S116), whereby the data archiving processing is completed.

Figure 21:
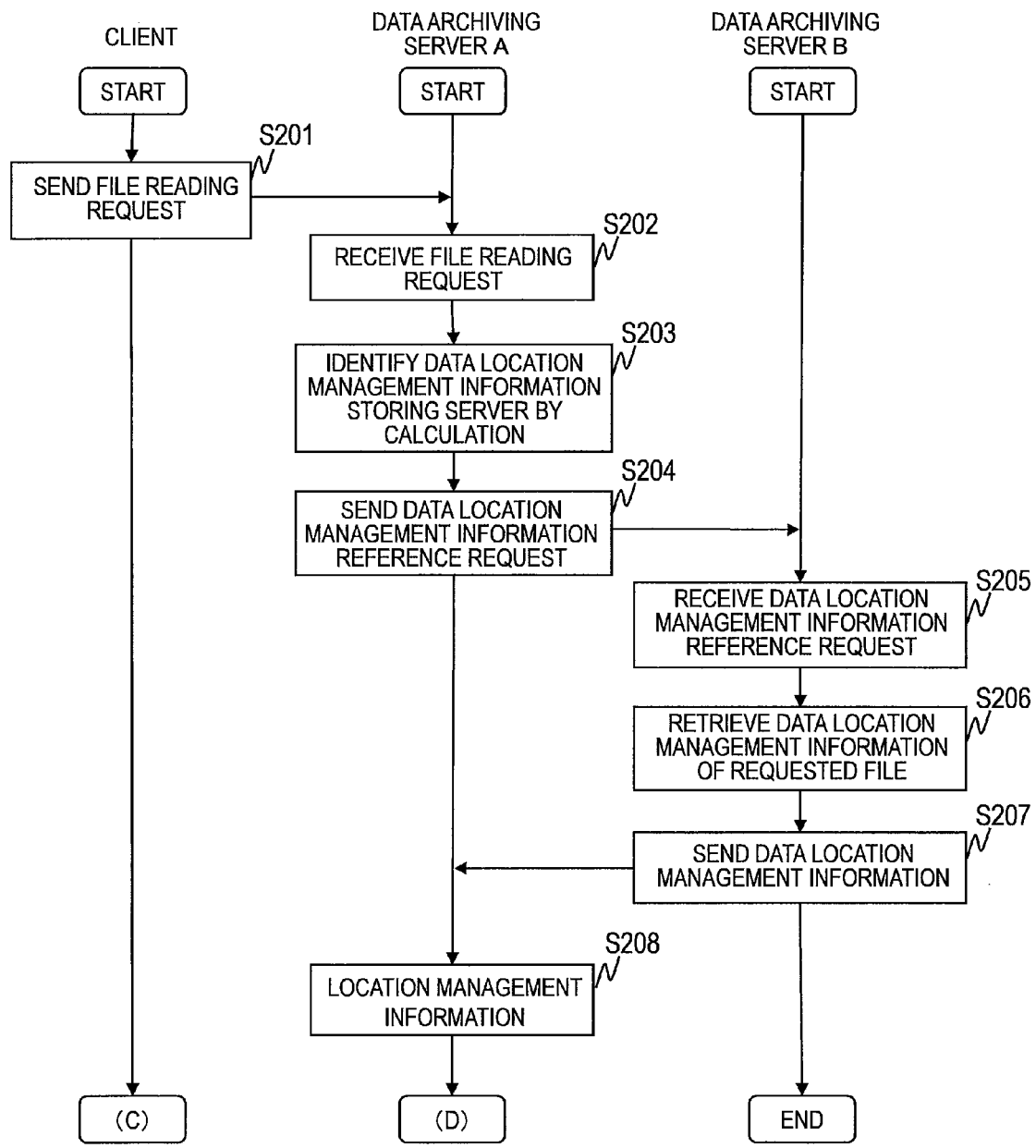
FIG. 21 is flow charts showing steps of processing of reading data that is archived in the data archiving system according to the embodiment of this invention.
Figure 22:
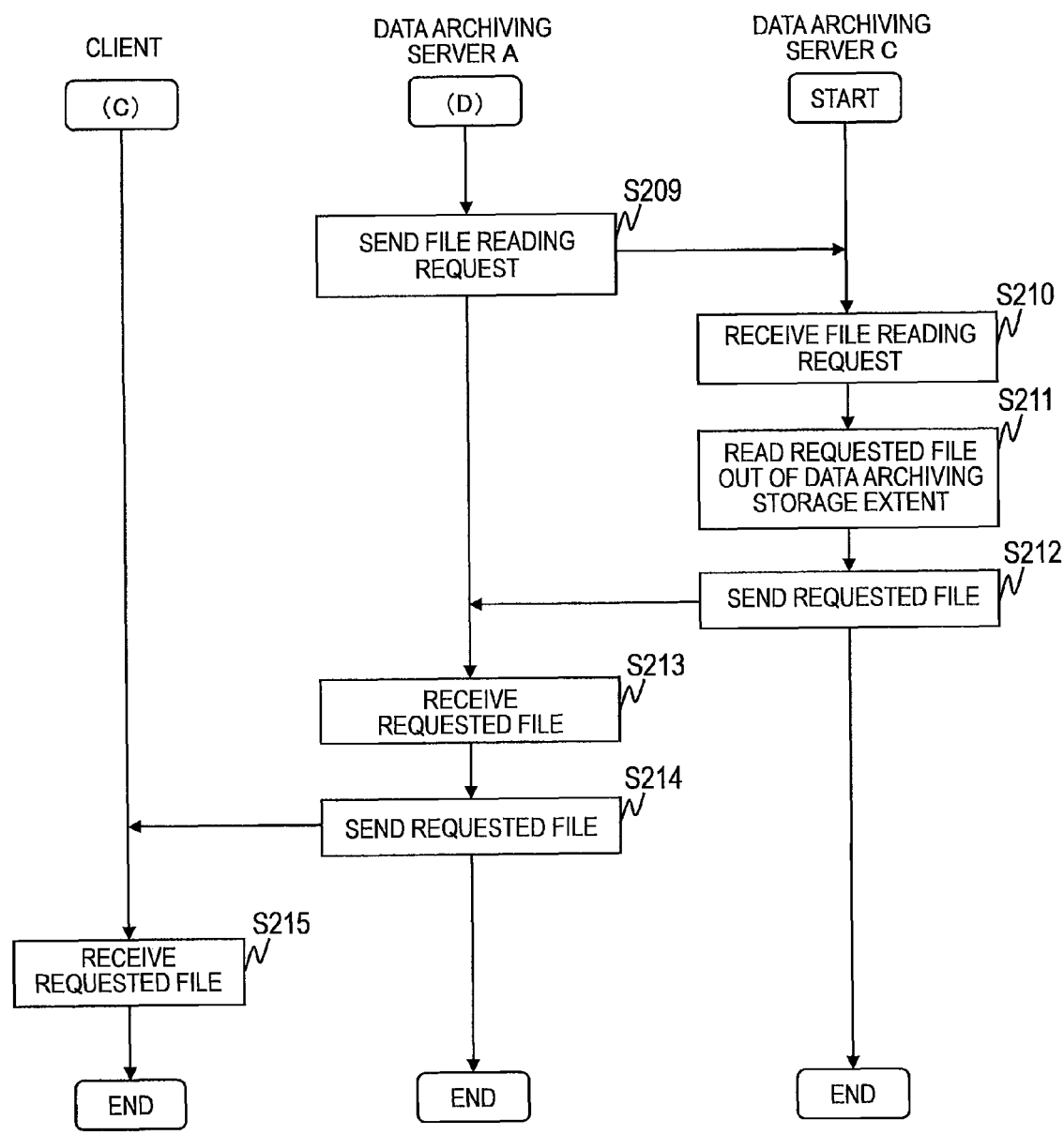
FIG. 22 is flow charts showing steps of processing of reading data that is archived in the data archiving system according to the embodiment of this invention.

FIGS. 21 and 22 are flow charts showing steps of processing of reading data that is archived in the data archiving system according to the embodiment of this invention. Steps shown in FIG. 21 are mainly for identifying where data is archived. Steps shown in FIG. 22 are mainly for actually reading a file.

The client 200 who wishes to read archived data first sends a reading request message in which a file name is specified to any data archiving server 300 (Step S201).

The processor unit 380 of the data archiving server 300 receives the reading request message sent from the client 200 (Step S202) and executes the data location management program 3004. Hereinafter, the data archiving server 300 that has received the reading request message is referred to as data archiving server A.

The processor unit 380 of the data archiving server A uses the data location management information storing server calculating program 3005 to identify the data location management information storing server that stores the data location management information 3006 of the file requested to be read (Step S203). The same calculation method as the one in Step S103 of FIG. 19 is employed.

The processor unit 380 of the data archiving server A uses the data location management program 3004 to send a data location management information reference request message which contains the file name to the identified data location management information storing server (Step S204). Hereinafter, the identified data location management information storing server is referred to as data archiving server B.

The processor unit 380 of the data archiving server B receives the data location management information reference request message from the data archiving server A (Step S205), and searches the data location management information 3006 for an entry whose file identification information 30061 matches the file name contained in the received message (Step S206). The processor unit 380 of the data archiving server B sends the search result to the data archiving server A (Step S207).

The processor unit 380 of the data archiving server A receives the search result of the data location management information 3006 from the data archiving server B (Step 208). The search result of the data location management information 3006 which has been received in Step S208 is used to send a file reading request to the data archiving server 300 where the requested data is archived (Step S209). Specifically, the data archiving server 300 to which the file reading request is sent is recorded in the data archiving server identification information 30062. The file reading request contains the data archiving storage extent identification information 30063 and the file identification information 30061. Hereinafter, the data archiving server 300 where the requested data is archived is referred to as data archiving server C.

The processor unit 380 of the data archiving server C receives the file reading request from the data archiving server A (Step S210), and executes the data I/O program 3001 to read the requested file out of the data archiving storage extent 3100 (Step S211). The read file is sent to the data archiving server A (Step S212).

The processor unit 380 of the data archiving server A receives the file sent from the data archiving server C (Step S213) and sends the received file to the client 200 (Step S214). The client 200 receives the sent file (Step S215), whereby the reading processing is completed.

A more specific description will be given on the data reading processing according to the embodiment of this invention. The description takes as an example a case in which the data archiving server 300C receives from one client 200 a request to read a file "0012.dat". The processor unit 380 of the data archiving server 300C identifies the data location management information storing server of the file "0012.dat". The data location management information storing server identified here is the data archiving server 300A, and the data archiving server 300C requests the data archiving server 300A to send over data location information.

The processor unit 380 of the data archiving server 300A refers to the data location management information 3006 shown in FIG. 14 to identify the storage location of the file "0012.dat". It is found as a result that the file "0012.dat" is stored in a storage extent "/mount/data3" of the data archiving server 300B, which is identified by "192.168.0.2".

The processor unit 380 of the data archiving server 300C requests the data archiving server 300B identified as where the file "0012.dat" is archived to read and send the file "0012.dat", and receives the file read by the data archiving server 300B.

Figure 23:
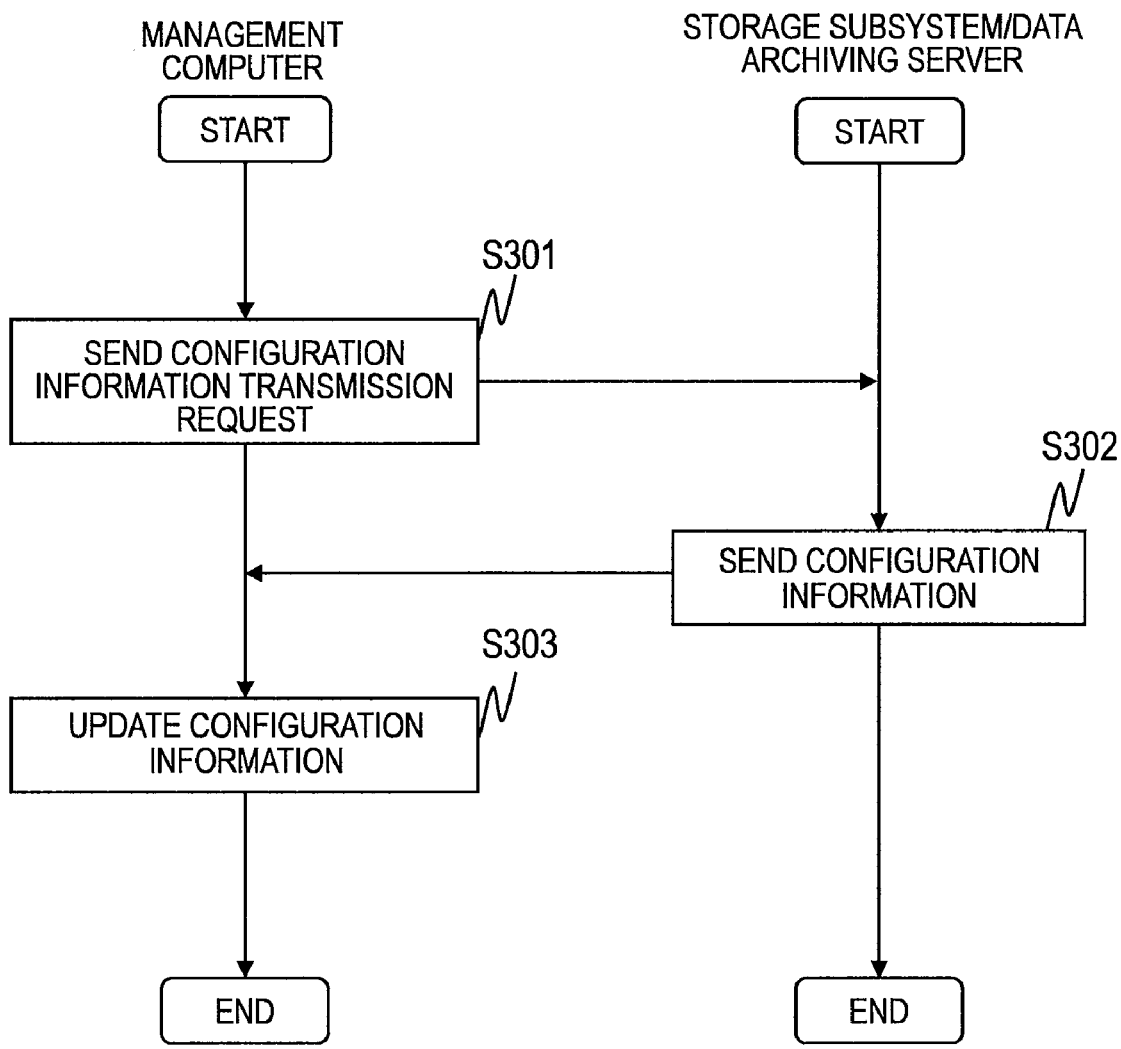
FIG. 23 is a flow chart showing steps of updating configuration information that is stored in the management computer according to the embodiment of this invention.

FIG. 23 is a flow chart showing steps of updating the configuration information that is stored in the management computer 500 according to the embodiment of this invention.

The processor unit 580 of the management computer 500 executes the configuration information updating service program 5004 to periodically send a configuration information transmission request to each storage subsystem 100 and to each data archiving server 300 (Step S301).

The storage controller 190 of the storage subsystem 100 or the processor unit 380 of the data archiving server 300 receives the configuration information transmission request from the management computer 500, and sends the requested configuration information to the management computer 500 (Step S302).

The processor unit 580 of the management computer 500 updates the storage subsystem logical unit configuration information 5001 or the data archiving server data archiving storage extent configuration information 5002 with the latest information based on the configuration information sent from the storage subsystem 100 and the data archiving server 300 (Step S303).

Figure 24:
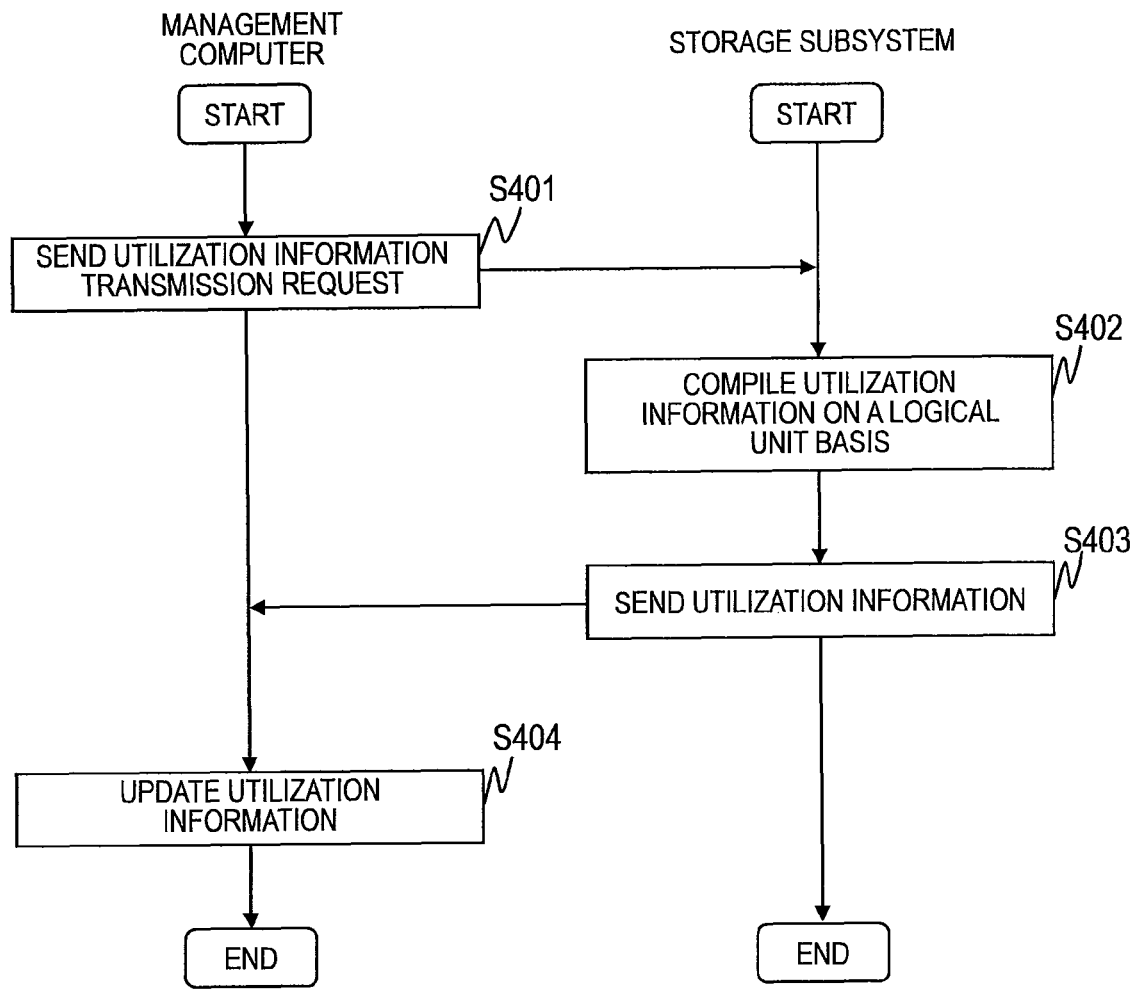
FIG. 24 is a flow chart showing steps of updating the storage subsystem logical unit utilization information of the management computer according to the embodiment of this invention.

FIG. 24 is a flow chart showing steps of updating the storage subsystem logical unit utilization information 5005 of the management computer 500 according to the embodiment of this invention. This processing corresponds to the utilization situation monitoring processing (Step S1) in the processing outline of FIG. 18.

The processor unit 580 of the management computer 500 executes the utilization information updating service program 5006 to periodically send a utilization information transmission request to each storage subsystem 100 (Step S401).

The storage controller 190 of the storage subsystem 100 receives the utilization information transmission request from the management computer 500, and refers to the logical unit configuration information 1004 in order to compile utilization information recorded in the storage utilization information 1006 on a logical unit basis (Step S402). The storage controller 190 of the storage subsystem 100 sends the utilization information compiled on a logical unit basis to the management computer 500 (Step S403).

The processor unit 580 of the management computer 500 updates the storage subsystem logical unit utilization information 5005 with the utilization information sent from the storage subsystem 100 (Step S404).

FIGS. 25 to 31 are flow charts showing steps of changing the configuration of the data archiving system according to the embodiment of this invention. In the following description of this processing, a specific example will be given with reference to FIG. 8.

Figure 25:
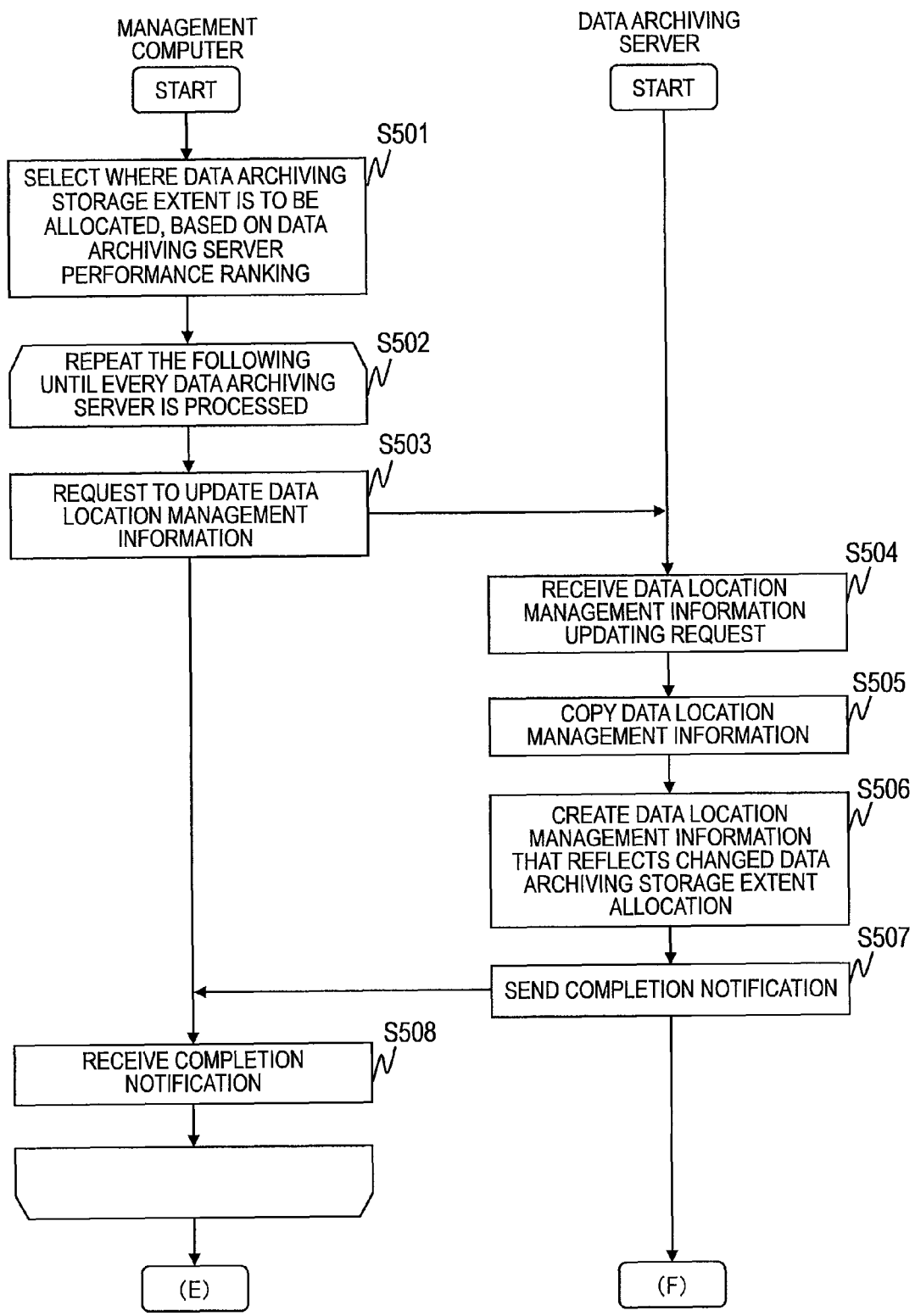
FIG. 25 is flow charts showing steps of changing the configuration of the data archiving system according to the embodiment of this invention.

Steps shown in FIG. 25 are for determining how the configuration is to be changed concretely and copying the data location management information 3006.

The processor unit 580 of the management computer 500 executes the data archiving storage extent allocation calculating program 5009 to determine the configuration of the data archiving system after a configuration change by selecting the data archiving servers 300 to which data archiving storage extents (logical units 1100) are to be re-allocated (Step S501).

Specifically, the storage subsystem logical unit utilization information 5005 is referred to in order to rank data archiving storage extents based on the load on the logical units 1100. The data archiving server performance information 5007 is next referred to in order to allocate the logical unit 1100 that has a heavy load to the data archiving server 300 that is ranked high according to the data I/O performance rank 50071 and allocate the logical unit 1100 that has a light load to the data archiving server 300 that is ranked low according to the data I/O performance rank 50071. The configuration of the data archiving system after a configuration change is determined in this manner.

More specifically, in the storage utilization information 1006 of FIG. 12 and the storage subsystem logical unit utilization information 5005 of FIG. 16, the logical unit 1100B constituted of "LD-02" has a heavy load and a logical unit 1100D constituted of "LD-04" has a light load.

In the data archiving server performance information 5007 of FIG. 17, the data I/O performance rank 50071 of the data archiving server 300C identified by "192.168.0.3" is higher than the data I/O performance rank 50071 of the data archiving server 300A identified by "192.168.0.1".

It is therefore judged that the balance between the performance and the load is improved by allocating the logical unit 1100A to the data archiving server "192.168.0.3" and the logical unit 1100D to the data archiving server "192.168.0.1".

The processor unit 580 of the management computer 500 then repeats Steps S503 to S508 until every data archiving server 300 is processed (Step S502).

The processor unit 580 of the management computer 500 executes the data location management information updating program 5010 to request each data archiving server 300 to update the data location management information 3006 (Step S503). This updating request sent to each data archiving server 300 contains the data archiving storage extent allocation information determined in Step S501.

Receiving the request to update the data location management information 3006 (Step S504), the processor unit 380 of the data archiving server 300 first makes a copy of the currently held data location management information 3006 (Step S505).

The processor unit 380 of the data archiving server 300 uses the data location management program 3004 to update the copy of the data location management information 3006 made in Step S505 in response to the updating request received in Step S504 (Step S506).

Specifically, the data archiving server identification information 30062 and data archiving storage extent identification information 30063 of the data location management information 3006 shown in FIG. 14 are updated with the selection made in Step S501. For example, in an entry for a file "0011.dat", the data archiving server identification information 30062 is updated with "192.168.0.3" and the data archiving storage extent identification information 30063 is updated with "/mount/data4". As a result, after Step S545 of FIG. 29 which will be described later, the data archiving server 300 interprets the location of the file "0011.dat" as "/mount/data4".

Finishing Step S506, the data archiving server 300 sends a completion notification to the management computer 500 (Step S507). The management computer 500 receives the completion notification from the data archiving server 300 (Step S508).

Figure 26:
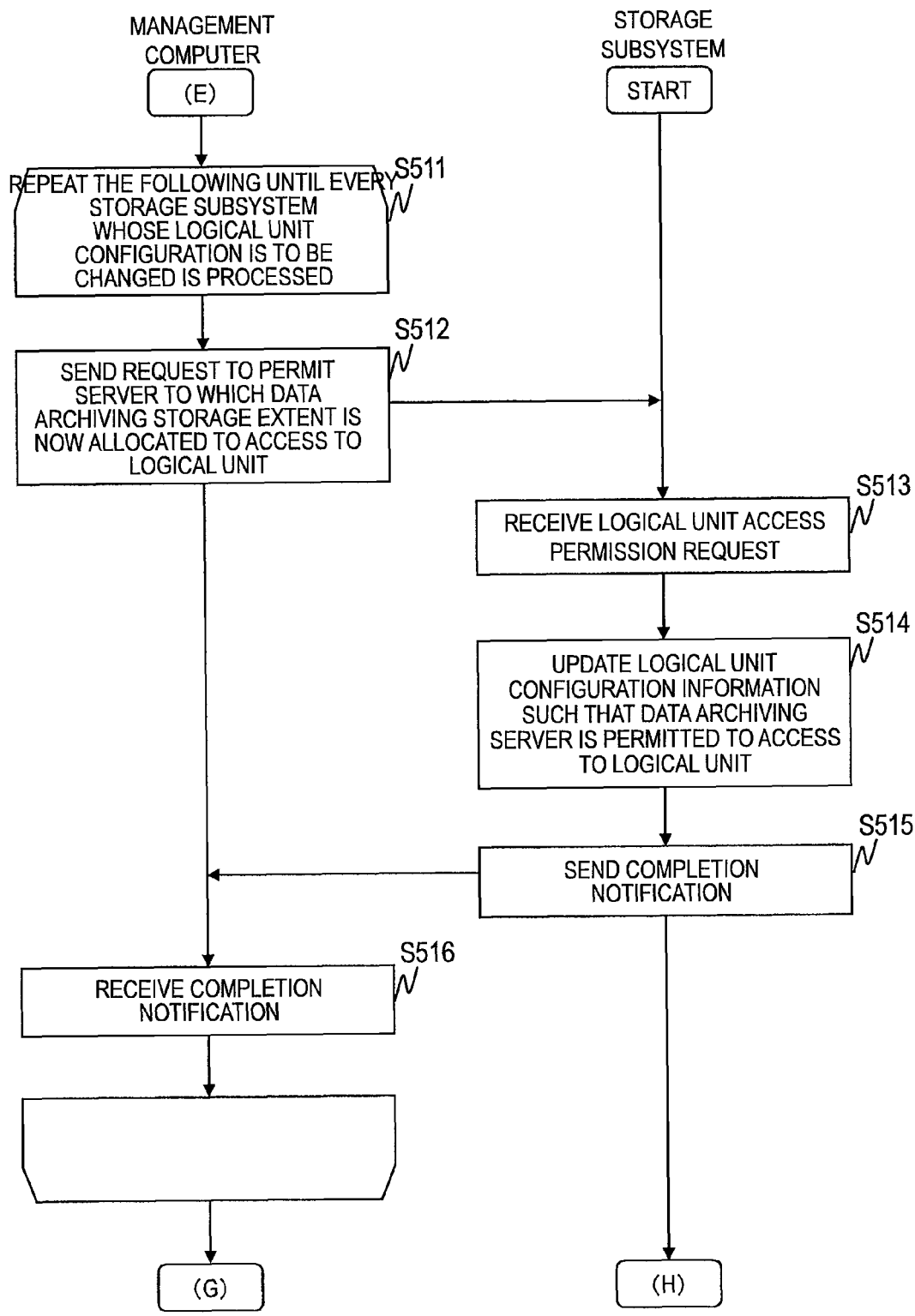
FIG. 26 is flow charts showing steps of changing the configuration of the data archiving system according to the embodiment of this invention.

Steps shown in FIG. 26 are for setting the data archiving system such that the data archiving servers 300 are permitted to access to the storage subsystems 100 according to the changed configuration. This processing corresponds to the access permission processing (Step S2) in the processing outline of FIG. 18.

The processor unit 580 of the management computer 500 executes Steps S512 to S516 for the storage subsystems 100 that provide the logical units 1100 associated with the data archiving storage extents 3100 that have been selected in Step S501 (Step S511).

The processor unit 580 of the management computer 500 uses the data location management program 5003 to send to each of these storage subsystems 100 a logical unit access permission request so that the data archiving servers 300 selected in Step S501 as servers to which the data archiving storage extents selected in Step S501 are to be re-allocated by the configuration change are permitted to access to these associated logical units 1100 (Step S512).

The storage controller 190 of the storage subsystem 100 receives the logical unit access permission request (Step S513), and updates the logical unit configuration information 1004 such that the data archiving server 300 is permitted to access to the logical unit 1100 (Step S514).

Specifically, in the logical unit configuration information 1004 of FIG. 11, "50:00:01:1E:0A:E8:A1" is added to the access-permitted communication interface identification information 10044 of an entry for the logical unit "LU-02". The added "50:00:01:1E:0A:E8:A1" is identification information of the data I/O interface 340 of the data archiving server 300 that is identified by "192.168.0.3".

Finishing updating the logical unit configuration information 1004, the storage controller 190 of the storage subsystem 100 sends a completion notification to the management computer 500 (Step S515). The management computer 500 receives the completion notification from the storage subsystem 100 (Step S516).

Figure 27:
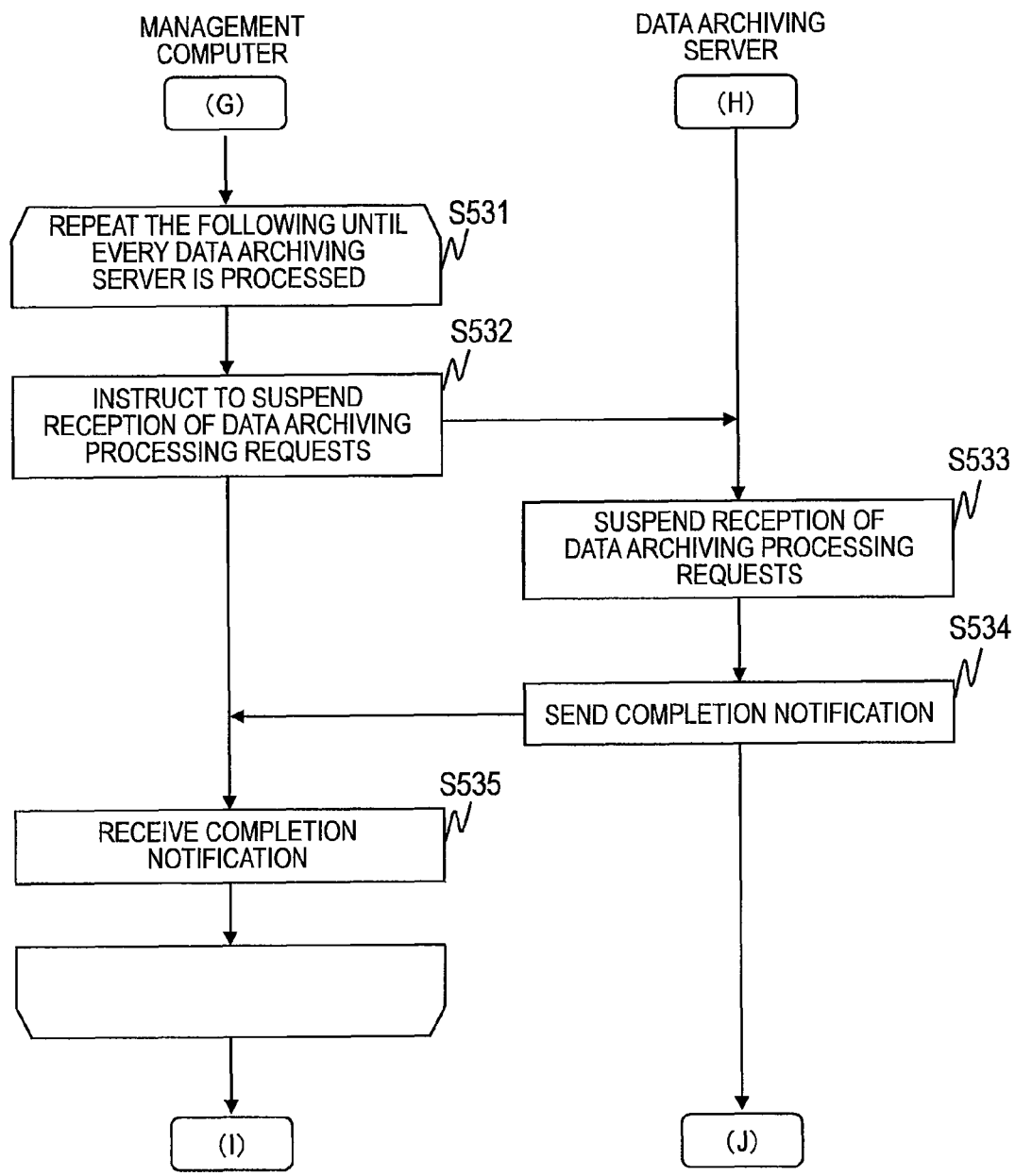
FIG. 27 is flow charts showing steps of changing the configuration of the data archiving system according to the embodiment of this invention.

When the steps up through the ones shown in FIG. 26 are finished, the reception of data archiving processing requests is stopped in order to actually change the configuration of the data archiving system. Steps shown in FIG. 27 are for making the data archiving servers 300 to suspend the reception of data archiving processing requests.

The processor unit 580 of the management computer 500 executes Steps S532 to S535 for every data archiving server 300 (Step S531).

The processor unit 580 of the management computer 500 first uses the data location management program 5003 to instruct the data archiving server 300 to suspend the reception of data archiving processing requests temporarily (Step S532).

The processor unit 380 of the data archiving server 300 receives the data archiving processing request suspension instruction from the management computer 500, and suspends the reception of data archiving processing requests (Step S533).

The processor unit 380 of the data archiving server 300 thereafter sends a completion notification to the management computer 500 (Step S534). The management computer 500 receives the completion notification sent by the data archiving server 300 (Step S535).

Figure 28:
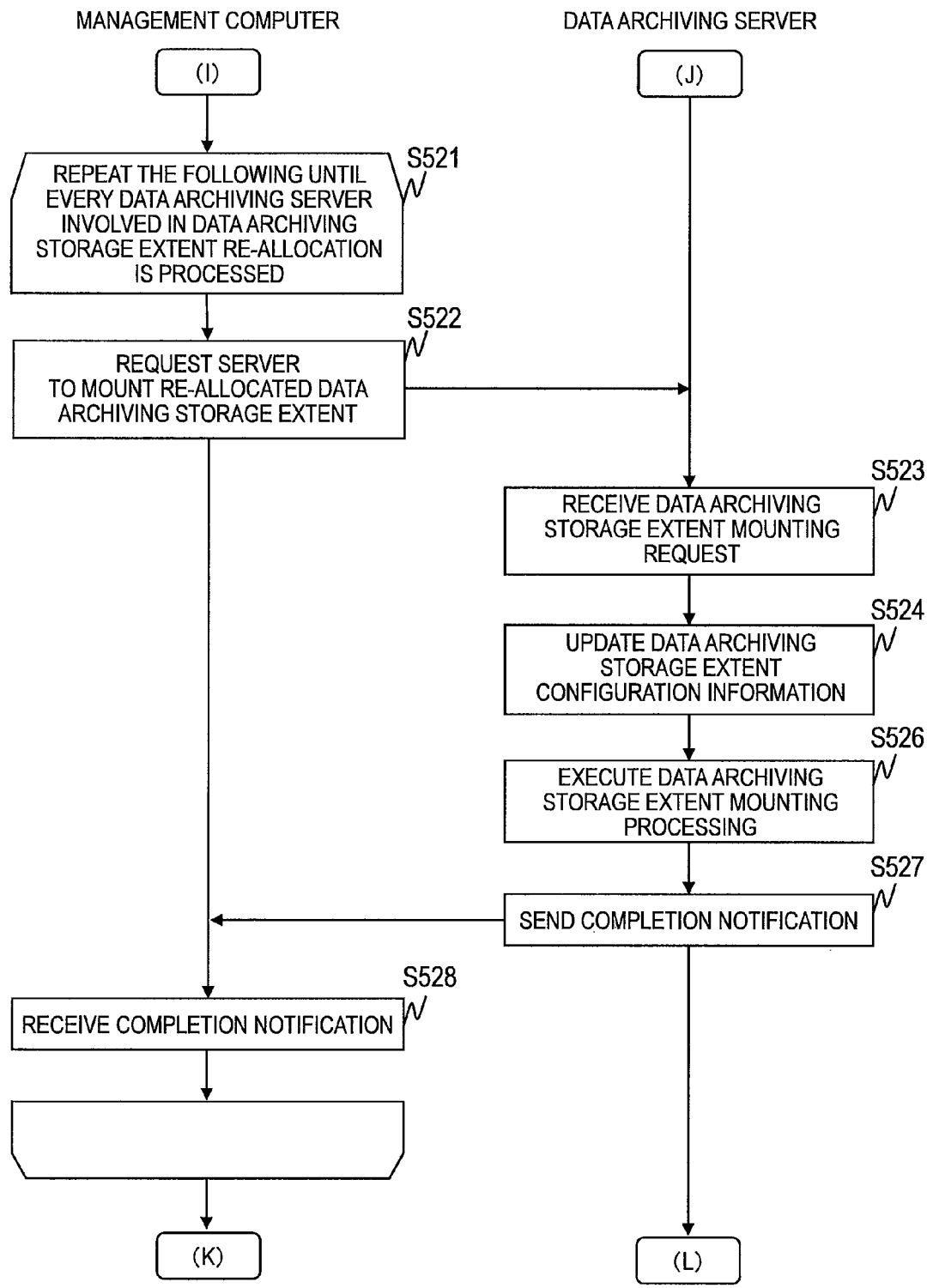
FIG. 28 is flow charts showing steps of changing the configuration of the data archiving system according to the embodiment of this invention.

When the data archiving servers 300 suspend the reception of data archiving processing requests, the data archiving system configuration is actually changed. Steps shown in FIG. 28 are for making the data archiving servers 300 mount the logical units according to the changed configuration. This processing corresponds to the mounting server switching processing (Step S3) in the processing outline of FIG. 18.

The processor unit 580 of the management computer 500 executes Steps S522 to S528 for the data archiving servers 300 selected in Step S501 (Step S521).

The processor unit 580 of the management computer 500 uses the data location management program 5003 to request the data archiving servers 300 to mount the data archiving storage extents 3100 selected to be re-allocated in Step S501 (Step S522).

The processor unit 380 of each relevant data archiving server 300 receives the mounting request from the management computer 500 (Step S523), and updates the data archiving storage extent configuration information 3003 (Step S524). Specifically, in the data archiving storage extent configuration information 3003 of FIG. 13, an entry for the data archiving storage extent "/mount/data2" is updated such that the storage unit identification information 30033 is changed to a logical unit "LU-31", which is registered to a communication interface "50:00:01:1E:0A:E8:04" (Step S524).

The processor unit 380 of the data archiving server 300 then executes mounting processing as requested (Step S526). After Step S526 is completed, the logical unit coupled to the data archiving storage extent "/mount/data2" is changed from 110B, and is 1100D from then on. The occupied capacity ratio 30034 and the transferred data amount 30035 are also updated as the mounting data archiving servers 300 are switched.

The processor unit 380 of the data archiving server 300 thereafter sends a completion notification to the management computer 500 (Step S527). The management computer 500 receives the completion notification sent by the data archiving server 300 (Step S528).

Figure 29:
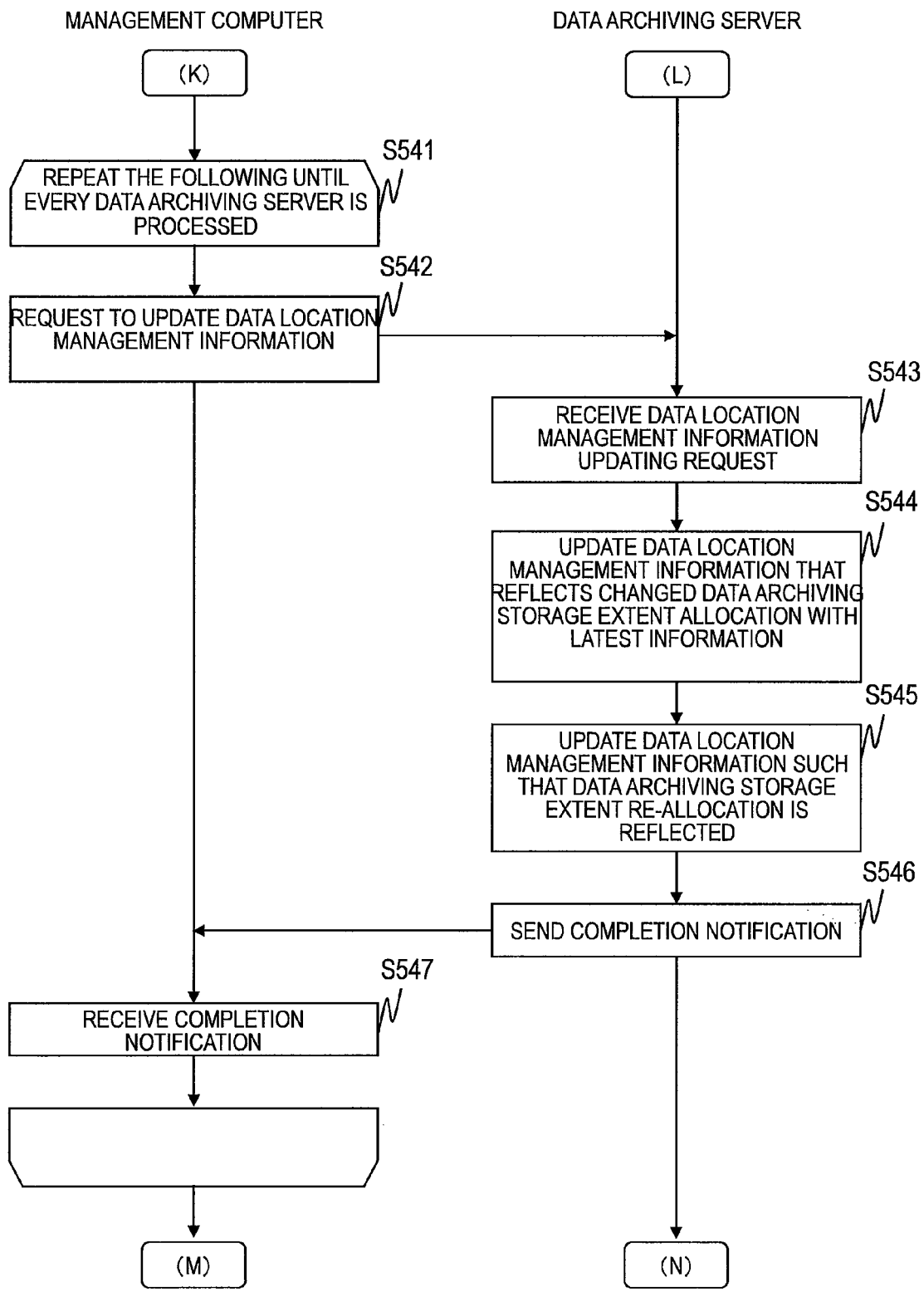
FIG. 29 is flow charts showing steps of changing the configuration of the data archiving system according to the embodiment of this invention.

Through the above processing, the logical units are mounted to the data archiving servers 300 according to the changed data archiving system configuration. To restart the reception of data archiving processing requests, the data location management information 3006 has to be updated. Steps shown in FIG. 29 are for making the data location management information 3006 of every data archiving server 300 reflect the configuration change. This processing corresponds to the configuration information updating processing (Step S4) in the processing outline of FIG. 18.

The processor unit 580 of the management computer 500 executes Steps S542 to S547 for every data archiving server 300 (Step S541).

The processor unit 580 of the management computer 500 uses the data location management information updating program 5010 to send a request to update the data location management information 3006 to each data archiving server 300 (Step S542).

The processor unit 380 of the data archiving server 300 receives the request to update the data location management information 3006 (Step S543), and updates the copy of the data location management information, which has been made to reflect the configuration change in Step S506 (post-configuration change data location management information), with the latest information (Step S544). This is because, at this point, only the copy of the data location management information 3006 is reflecting the changed configuration. The processor unit 380 of the data archiving server 300 then replaces the original data location management information 3006 with the post-configuration change data location management information updated in Step S544 (Step S545).

This sequence of making a copy in Step S505, updating the copy in Steps S506 and S544, and replacing the original with the updated copy in Step S545 is executed in order to cut short the period of time in which the reception of processing requests is suspended. In the case where the data location management information 3006 is updated in Step S545, there is no need to execute Steps S506 and S544, but data consistency must be kept by suspending the reception of data archiving processing requests at the time the processing of FIG. 25 is started. This alternative method may therefore make the processing request reception suspension period longer compared to the method according to the embodiment of this invention.

Finishing Step S545, the processor unit 380 of the data archiving server 300 sends a completion notification to the management computer 500 (Step S546). The management computer 500 receives the completion notification sent by the data archiving server 300 (Step S547).

Figure 30:
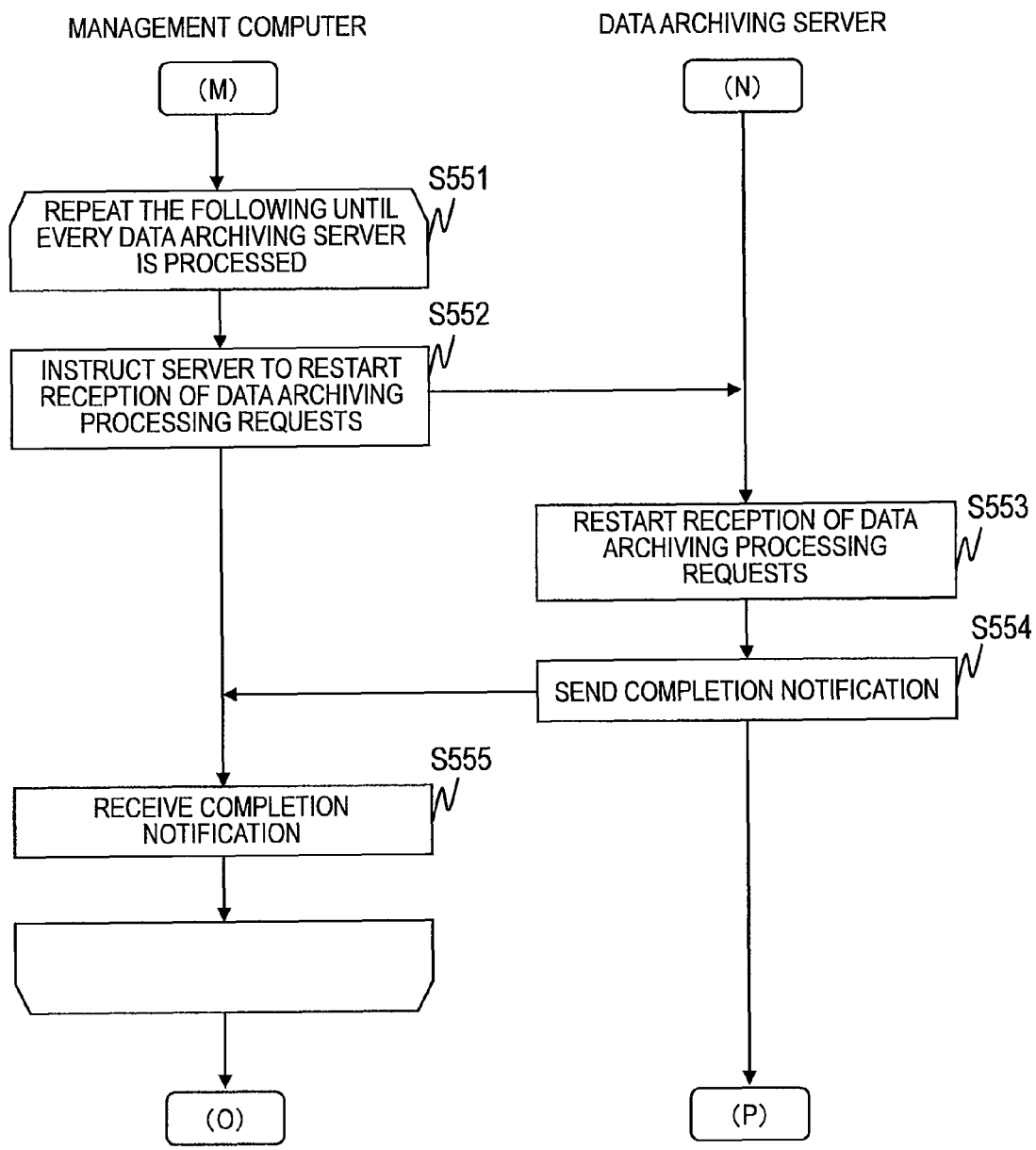
FIG. 30 is flow charts showing steps of changing the configuration of the data archiving system according to the embodiment of this invention.

Subsequently, the reception of data archiving processing requests which has been suspended is restarted. Steps shown in FIG. 30 are for making the data archiving servers 300 resume the reception of data archiving processing requests.

The processor unit 580 of the management computer 500 executes Steps S552 to S555 for every data archiving server 300 (Step S551).

The processor unit 580 of the management computer 500 first uses the data location management program 5003 to instruct each data archiving server 300 to restart the reception of data archiving processing requests (Step S552).

The processor unit 380 of the data archiving server 300 receives from the management computer 500 the request to resume the reception of data archiving processing requests, and restarts the reception of data archiving processing requests (Step S553).

The processor unit 380 of the data archiving server 300 thereafter sends a completion notification to the management computer 500 (Step S554). The management computer 500 receives the completion notification sent by the data archiving server 300 (Step S555).

Figure 31:
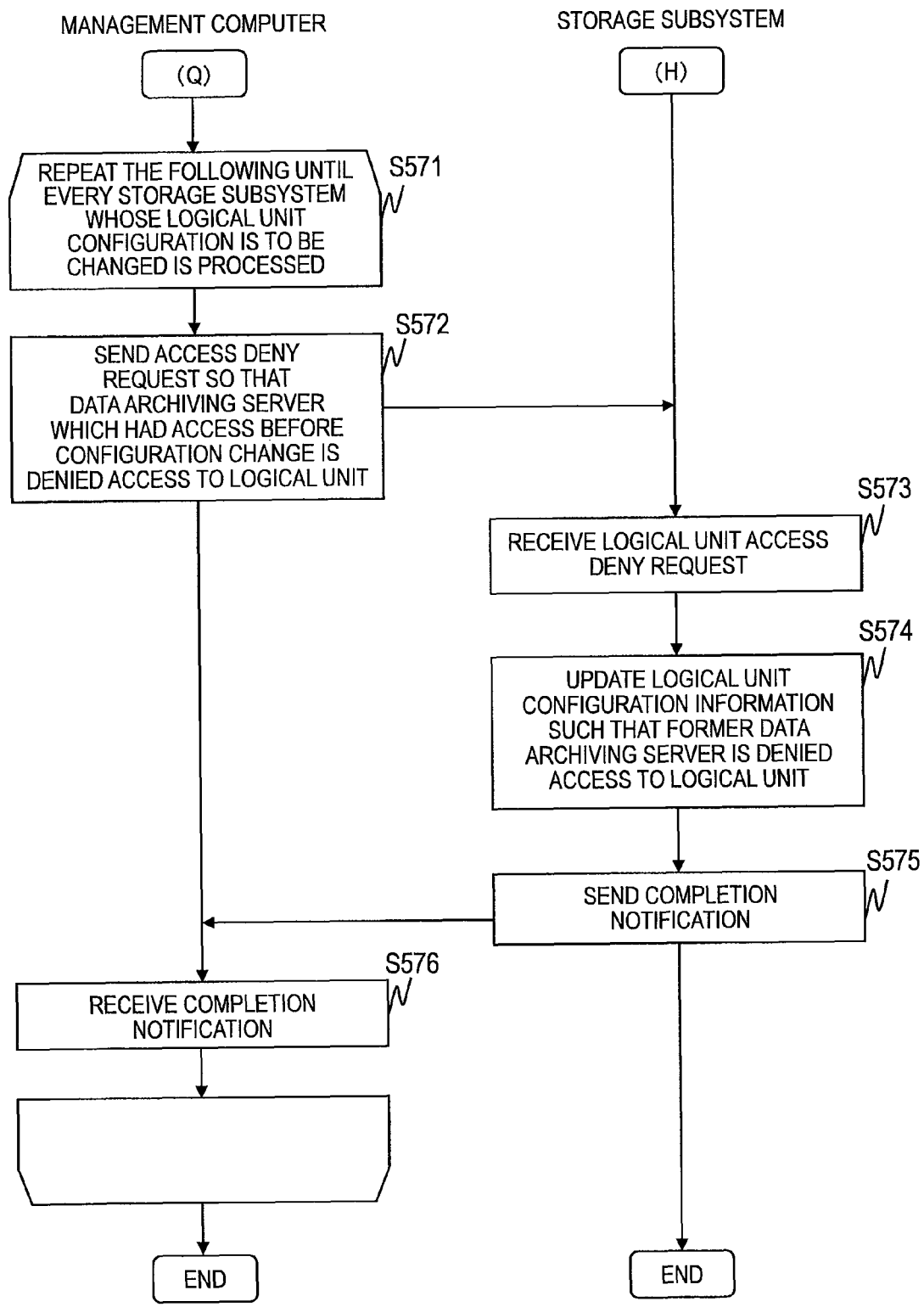
FIG. 31 is flow charts showing steps of changing the configuration of the data archiving system according to the embodiment of this invention.

Lastly, settings that have permitted the data archiving servers 300 to access to the storage subsystems 100 prior to the configuration change of the data archiving system are changed. Steps shown in FIG. 31 are for setting the data archiving system such that the data archiving servers 300 are denied access to the storage subsystems 100 according to the changed configuration.

The processor unit 580 of the management computer 500 executes Steps S572 to S576 for every storage subsystem 100 that provides the logical unit 1100 selected in Step S501 to be re-allocated (Step S571).

The processor unit 580 of the management computer 500 uses the data location management program 5003 to specify the data archiving server 300 that has been permitted to access to this logical unit 1100 before the configuration change, and instruct the storage subsystem 100 to deny the specified data archiving server 300 access to the logical unit 1100 (Step S572).

The storage controller 190 of the storage subsystem 100 receives the logical unit access deny request (Step S573), and updates the logical unit configuration information 1004 such that the data archiving server 300 specified in the logical unit access deny request is denied access to the logical unit 1100 (Step S574).

Specifically, in the logical unit configuration information 1004 of FIG. 11, "50:00:01:1E:0A:E8:A1" left in the access-permitted communication interface identification information 10044 is deleted from an entry for the logical unit "LU-12". The deleted "50:00:01:1E:0A:E8:A1" is identification information of the data I/O interface 340 of the data archiving server 300 that is identified by "192.168.0.1" and that has been permitted to access to "LU-12" before the configuration change.

Finishing updating the logical unit configuration information 1004, the storage controller 190 of the storage subsystem 100 sends a completion notification to the management computer 500 (Step S575). The management computer 500 receives the completion notification from the storage subsystem 100 (Step S576).

The configuration of the data archiving system is changed through the above processing. Lastly, a description will be given on a window through which change instructions are entered when the administrator manually changes the data archiving system configuration.

Figure 32:
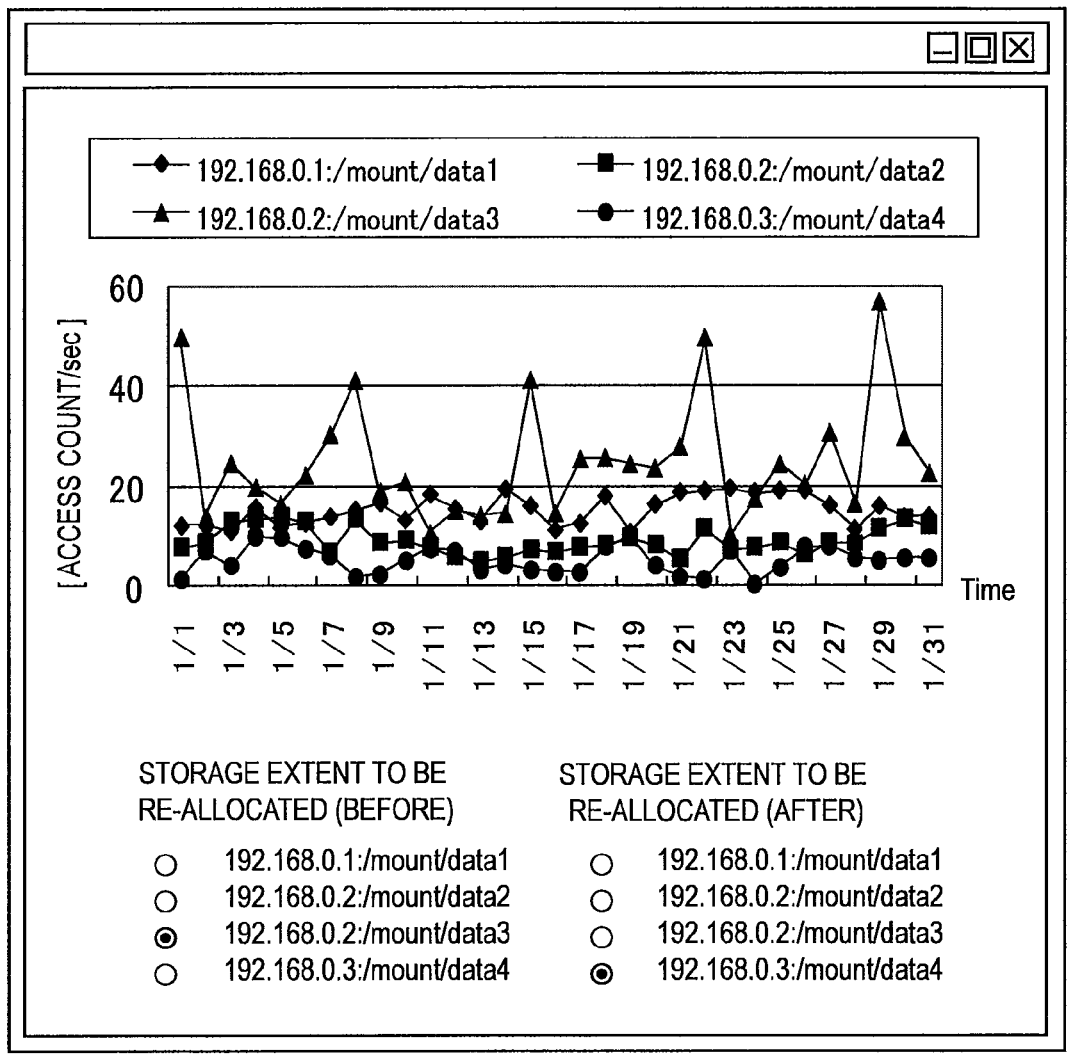
FIG. 32 is a diagram showing an example of a window that is used to enter an instruction for changing the configuration of the data archiving system according to the embodiment of this invention.

FIG. 32 is a diagram showing an example of a window that is used to enter an instruction for changing the configuration of the data archiving system according to the embodiment of this invention.

Step S501 of the flow chart of FIG. 25 shows an example of allocating a data archiving storage extent that has the heaviest load to the data archiving server 300 that has the highest performance. Alternatively, the configuration of the data archiving system may be changed manually by the administrator.

Load information of each data archiving storage extent which is based on the storage subsystem logical unit utilization information 5005 is output to and displayed in an upper part of the window. Placed in a lower part of the window is an interface for selecting data archiving storage extents that are to be switched with each other for re-allocation.

The administrator considers the optimum allocation of data archiving storage extents while viewing the utilization data displayed in the upper part of the window, and selects two data archiving storage extents to be switched with each other.

According to the embodiment of this invention, a performance difference between components of a data archiving system due to long-term operation of the data archiving system is prevented from destroying the balance between the performance of the data archiving servers 300 and the load on the storage subsystems 100, which otherwise causes a performance bottleneck. Lowering of the overall performance of the system can thus be avoided.

The embodiment of this invention where the configuration of the data archiving system is changed by updating metadata also makes it possible to reconfigure the system without moving data stored in the storage subsystems 100. Therefore, when changing the system configuration, the operation load is reduced and the period in which the system is shut down is cut short.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a plurality of data archiving servers in which a client stores data;
a storage subsystem which provides storage extents to the plurality of data archiving servers; and
a management computer which include access to the plurality of data archiving servers and the storage subsystem,
wherein the plurality of data archiving servers each comprise a first interface coupled to the storage subsystem, a first processor coupled to the first interface, and a first memory coupled to the first processor, and provide the client with data archiving storage extents to which the storage extents are allocated, wherein the storage subsystem comprises a second interface coupled to the plurality of data archiving servers, a second processor coupled to the second interface, and a second memory coupled to the second processor, wherein the management computer comprises a third interface coupled to the plurality of data archiving servers and the storage subsystem, a third processor coupled to the third interface, and a third memory coupled to the third processor, wherein the plurality of data archiving servers each manage data location management information, which holds association between the data and a data archiving server of the plurality of data archiving servers that stores the data, and data archiving storage extent configuration information, which holds association between the data archiving storage extents and the storage extents, wherein the data location management information is managed by the data archiving server that is determined based on the data, wherein the management computer manages data archiving server performance management information, which holds information about performance of the plurality of data archiving servers, and storage utilization information, which holds information about load on the storage extents, wherein the plurality of data archiving servers are each configured to:

identify, upon reception of a request from the client to read data, according to the data requested to be read, a data archiving server of the plurality of data archiving servers that manages data location management information of the requested data;

obtain the data location management information managed by the identified data archiving server;

identify, from the obtained data location management information, a data archiving server of the plurality of data archiving servers that is storing the requested data; and obtain the requested data from the data archiving server that is storing the requested data, wherein the management computer is configured to:

select, based on the data archiving server performance management information and the storage utilization information, data archiving storage extents whose association with the storage extents are to be changed;

select, based on the storage utilization information, storage extents that are to be newly allocated to the selected data archiving storage extents; and notify the plurality of data archiving servers that provide the selected data archiving storage extents of the storage extents selected to be newly allocated, and wherein the plurality of data archiving servers are each further configured to:

allocate the storage extents notified by the management computer to the selected data archiving storage extents; and update the data location management information and the data archiving storage extent configuration information.

2. The computer system according to claim 1, wherein the management computer is further configured to:

select, based on a storage utilization information, a storage extent that has the heaviest load;

select, based on the data archiving server performance management information, a data archiving server of the plurality of data archiving servers that has a highest performance; and allocate the selected storage extent to a data archiving storage extent that is provided by the selected data archiving server.

3. The computer system according to claim 1, wherein the management computer is further configured to:

select, based on the storage utilization information, a storage extent that has a lightest load;

select, based on the data archiving server performance management information, a data archiving server of the plurality of data archiving servers that has a lowest performance; and allocate the selected storage extent to a data archiving storage extent that is provided by the selected data archiving server.

4. The computer system according to claim 1, wherein the storage subsystem is further configured to manage storage configuration information which holds identification information of the plurality of data archiving servers that are permitted to access to the storage extents, wherein the management computer notifies the storage subsystem providing the storage extents whose association has been changed of identification information of the plurality of data archiving servers that provide the data archiving storage extents whose association has been changed, and wherein the storage subsystem is further configured to deny the plurality of data archiving servers that are identified by the notified identification information access to the storage extents whose association has been changed.

5. The computer system according to claim 1, wherein the plurality of data archiving servers are each further configured to:

make a copy of the data location management information in a case where the management computer instructs to change the association between the data archiving storage extents and the storage extents;

update the copy of the data location management information; and update the data location management information based on the copy of location management information.

6. A configuration management method for a computer system that comprises a plurality of data archiving servers in which a client stores data, a storage subsystem which provides storage extents to the plurality of data archiving servers, and a management computer which has access to the plurality of data archiving servers and the storage subsystem, the plurality of data archiving servers each having a first interface coupled to the storage subsystem, a first processor coupled to the first interface, and a first memory coupled to the first processor, and providing the client with data archiving storage extents to which the storage extents are allocated, the storage subsystem having a second interface coupled to the plurality of data archiving servers, a second processor coupled to the second interface, and a second memory coupled to the second processor, the management computer having a third interface coupled to the plurality of data archiving servers and the storage subsystem, a third processor coupled to the third interface, and a third memory coupled to the third processor, the plurality of data archiving servers each managing data location management information, which holds association between the data and a data archiving server of the plurality of data archiving servers that stores the data, and data archiving storage extent configuration information, which holds association between the data archiving storage extents and the storage extents, the data location management information being managed by the data archiving server that is determined based on the data, the management computer managing data archiving server performance management information, which holds information about performance of the plurality of data archiving servers, and storage utilization information, which holds information about load on the storage extents, the plurality of data archiving servers each being configured to:

identify, upon reception of a request from the client to read data, according to the data requested to be read, a data archiving server of the plurality of data archiving servers that manages data location management information of the requested data;

obtain the data location management information managed by the identified data archiving server;

identify, from the obtained data location management information, a data archiving server of the plurality of data archiving servers that is storing the requested data; and obtain the requested data from the data archiving server that is storing the requested data, the configuration management method comprising the steps of:

selecting, by the third processor, based on the data archiving server performance management information and the storage utilization information, data archiving storage extents whose association with the storage extents are to be changed;

selecting, by the third processor, based on the storage utilization information, storage extents that are to be newly allocated to the selected data archiving storage extents;

notifying, by the third processor, the plurality of data archiving servers that provide the selected data archiving storage extents of the storage extents selected to be newly allocated;

allocating, by the first processor, the storage extents notified by the management computer to the selected data archiving storage extents; and updating, by the first processor, the data location management information and the data archiving storage extent configuration information.

7. The configuration management method according to claim 6, further comprising the steps of:

selecting, by the third processor, based on the storage utilization information, a storage extent that has a heaviest load;

selecting, by the third processor, based on the data archiving server performance management information, a data archiving server of the plurality of data archiving servers that has a highest performance; and allocating, by the third processor, the selected storage extent to a data archiving storage extent that is provided by the selected data archiving server.

8. The configuration management method according to claim 6, further comprising the steps of:

selecting, by the third processor, based on the storage utilization information, a storage extent that has a lightest load;

selecting, by the third processor, based on the data archiving server performance management information, a data archiving server of the plurality of data archiving servers that has a lowest performance; and allocating, by the third processor, the selected storage extent to a data archiving storage extent that is provided by the selected data archiving server.

9. The configuration management method according to claim 6, wherein the storage subsystem manages storage configuration information which holds identification information of the plurality of data archiving servers that are permitted to access to the storage extents, and wherein the configuration management method further comprises the steps of:

notifying, by the third processor, the storage subsystem providing the storage extents whose association has been changed of identification information of the plurality of data archiving servers that provide the data archiving storage extents whose association has been changed; and denying, by the second processor, the plurality of data archiving servers that are identified by the notified identification information access to the storage extents whose association has been changed.

10. The configuration management method according to claim 6, further comprising the steps of:

making, by the first processor, a copy of the data location management information in a case where the management computer instructs to change the association between the data archiving storage extents and the storage extents;

updating, by the first processor, the copy of data location management information; and updating, by the first processor, the data location management information based on the copy of the data location management information.

11. A management computer having access to a plurality of data archiving servers and a storage subsystem in a computer system, the plurality of data archiving servers being used by a client to store data, the storage subsystem providing storage extents to the plurality of data archiving servers, the plurality of data archiving servers providing the client with data archiving storage extents to which the storage extents are allocated, the management computer comprising:

an interface coupled to the plurality of data archiving servers and the storage subsystem;

a processor coupled to the interface; and a memory coupled to the processor, wherein the processor is configured to:

manage data archiving server performance management information, which holds information about performance of the plurality of data archiving servers, and storage utilization information, which holds information about load on the storage extents;

select, based on the data archiving server performance management information and the storage utilization information, data archiving storage extents whose association with the storage extents are to be changed;

select, based on the storage utilization information, storage extents that are to be newly allocated to the selected data archiving storage extents; and notify the plurality of data archiving servers that provide the selected data archiving storage extents of the storage extents selected to be newly allocated.

12. The management computer according to claim 11, wherein the processor is further configured to:

select, based on the storage utilization information, a storage extent that has a heaviest load;

select, based on the data archiving server performance management information, a data archiving server of the plurality of data archiving servers that has a highest performance; and allocate the selected storage extent to a data archiving storage extent that is provided by the selected data archiving server.

13. The management computer according to claim 11, wherein the processor is further configured to:

select, based on the storage utilization information, a storage extent that has a lightest load;

select, based on the data archiving server performance management information, a data archiving server of the plurality of data archiving servers that has a lowest performance; and allocate the selected storage extent to a data archiving storage extent that is provided by the selected data archiving server.

14. The management computer according to claim 11, wherein the storage subsystem manages storage configuration information which holds identification information of the plurality of data archiving servers that are permitted to access to the storage extents, and wherein the processor is further configured to:

notify the storage subsystem providing the storage extents whose association has been changed of identification information of the plurality of data archiving servers that provide the data archiving storage extents whose association has been changed; and deny the plurality of data archiving servers that are identified by the notified identification information access to the storage extents whose association has been changed.

* * * * *